(12) United States Patent
Choi et al.

(10) Patent No.: US 11,962,096 B2
(45) Date of Patent: Apr. 16, 2024

(54) ELECTRONIC DEVICE COMPRISING ANTENNAS

(71) Applicant: Samsung Electronics Co., Ltd., Suwon-si (KR)

(72) Inventors: Sehwan Choi, Suwon-si (KR); Sukgi Hong, Suwon-si (KR); Moonseok Kang, Suwon-si (KR); Hyunchul Kim, Suwon-si (KR); Yi Yang, Suwon-si (KR); Jungsik Park, Suwon-si (KR); Sungjun Lim, Suwon-si (KR); Jonghoon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 17/727,190

(22) Filed: Apr. 22, 2022

(65) Prior Publication Data
US 2022/0247073 A1 Aug. 4, 2022

Related U.S. Application Data

(63) Continuation of application No. PCT/KR2020/013999, filed on Oct. 14, 2020.

(30) Foreign Application Priority Data

Oct. 24, 2019 (KR) .................. 10-2019-0133294

(51) Int. Cl.
*H01Q 3/34* (2006.01)
*G06T 7/70* (2017.01)
*H01Q 21/28* (2006.01)

(52) U.S. Cl.
CPC .............. *H01Q 3/34* (2013.01); *G06T 7/70* (2017.01); *H01Q 21/28* (2013.01)

(58) Field of Classification Search
None
See application file for complete search history.

(56) References Cited

U.S. PATENT DOCUMENTS 9,287,618 B2    3/2016  Kodama et al.
2004/0029558 A1 2/2004  Liu
(Continued)

FOREIGN PATENT DOCUMENTS

JP    2009-284525 A    12/2009
JP    2015-033079 A    2/2015
(Continued)

*Primary Examiner* — Wilson Lee
(74) *Attorney, Agent, or Firm* — Jefferson IP Law, LLP

(57) ABSTRACT

An electronic device is provided. The electronic device includes a housing, a first antenna and a second antenna which are disposed near at least one edge of the housing inside the housing and a first distance away from each other, wherein the first antenna and second antenna are positioned different distances away from an edge vertical to the one edge, a communication circuit operatively connected to the first antenna and second antenna, at least one sensor, a processor, and a memory. The memory can store instructions which, when executed, enable the processor to identify the posture of the electronic device by means of at least one sensor, if the identified posture of the electronic device is a landscape state, determine the position of at least one external electronic device on the basis of at least one signal received from the at least one external electronic device, and, if the identified posture of the electronic device is a portrait state, determine the position of an external electronic device on the basis of a signal received from the external electronic device positioned in a direction which is determined on the basis of the placements of the first antenna and second antenna among the at least one external electronic device.

10 Claims, 37 Drawing Sheets

(56) References Cited

U.S. PATENT DOCUMENTS

| | | |
|---|---|---|
| 2006/0276221 A1 | 12/2006 | Lagnado et al. |
| 2012/0196651 A1 | 8/2012 | Nakamura |
| 2013/0156080 A1 | 6/2013 | Cheng et al. |
| 2014/0192845 A1* | 7/2014 | Szini ............... H04B 7/061 |
| | | 375/267 |
| 2016/0253651 A1* | 9/2016 | Park ............... G06Q 20/34 |
| | | 705/39 |
| 2016/0366548 A1 | 12/2016 | Wang et al. |
| 2017/0237149 A1* | 8/2017 | Lee ............... G06F 1/1698 |
| | | 361/679.21 |
| 2017/0356980 A1 | 12/2017 | Islam et al. |
| 2019/0052340 A1 | 2/2019 | Yuan |
| 2019/0246364 A1 | 8/2019 | Jung et al. |

FOREIGN PATENT DOCUMENTS

| | | |
|---|---|---|
| JP | 2015-061218 A | 3/2015 |
| JP | 2015-133741 A | 7/2015 |
| JP | 6377657 B2 | 8/2018 |
| KR | 10-2016-0025150 A | 3/2016 |
| KR | 10-2018-0045388 A | 5/2018 |
| KR | 10-2019-0024107 A | 3/2019 |
| KR | 10-2019-0095076 A | 8/2019 |

\* cited by examiner

ELECTRONIC DEVICE COMPRISING ANTENNAS

CROSS-REFERENCE TO RELATED APPLICATION(S)

This application is a continuation application, claiming priority under § 365(c), of an International application No. PCT/KR2020/013999, filed on Oct. 14, 2020, which is based on and claims the benefit of a Korean patent application number 10-2019-0133294, filed on Oct. 24, 2019, in the Korean Intellectual Property Office, the disclosure of which is incorporated by reference herein in its entirety.

BACKGROUND

1. Field

The disclosure relates to an electronic device including antennas.

2. Description of Related Art

An electronic device may support various technologies for location detection. For example, ultra-wide band (UWB) technology for location detection is wireless communication technology for transmitting information across wide bands by using pulse energy and pulse strings. The UWB technology may measure the location of an electronic device and/or external electronic device by a method such as angle of arrival (AoA), time of flight (TOF), or time difference of arrival (TDOA).

The above information is presented as background information only to assist with an understanding of the disclosure. No determination has been made, and no assertion is made, as to whether any of the above might be applicable as prior art with regard to the disclosure.

SUMMARY

An electronic device having mobility, such as a smartphone, may use radio frequency (RF) signals to provide a location-based service. The electronic device may be equipped with an antenna to transmit and receive the RF signals. The performance of a location-based service using the antenna mounted in the electronic device to transmit and receive the RF signals may be degraded depending on the posture of the electronic device.

Aspects of the disclosure are to address at least the above-mentioned problems and/or disadvantages and to provide at least the advantages described below. Accordingly, an aspect of the disclosure is to provide an electronic device for a location-based service by using an antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing configured to include a first edge, a second edge substantially parallel to the first edge, a third edge extending from one end of the first edge to one end of the second edge and longer than the first edge, and a fourth edge extending from the other end of the first edge to the other end of the second edge and longer than the first edge, a first antenna and a second antenna configured to be disposed in the housing to be spaced apart by a first distance to the third edge, the first antenna and the second antenna being located at different distances from the first edge, a communication circuit configured to be electrically connected to the first antenna and the second antenna, at least one sensor configured to be disposed in the housing, a processor configured to be electrically connected to the first antenna, the second antenna, the communication circuit, and the at least one sensor, and a memory configured to be electrically connected to the processor, wherein the memory stores instructions which, when executed, enable the processor to identify the posture of the electronic device using the at least one sensor, determine, when the identified posture of the electronic device is in a landscape state, the location of at least one external electronic device based on at least one signals received from the at least one external electronic device, and determine, when the identified posture of the electronic device is in a portrait state, the location of the external electronic device based on a signal received from the external electronic device located in a direction determined based on the arrangement of the first antenna and the second antenna among the at least one external electronic device.

In accordance with another aspect of the disclosure, an electronic device is provided. The electronic device includes a housing configured to include a first edge, a second edge substantially parallel to the first edge, a third edge extending from one end of the first edge to one end of the second edge and longer than the first edge, and a fourth edge extending from the other end of the first edge to the other end of the second edge and longer than the first edge, a first antenna and a second antenna in the housing, the first antenna and the second antenna being spaced apart from the third edge by a first distance and being located at different distances from the first edge, a communication circuit configured to be electrically connected to the first antenna and the second antenna, a sensor configured to acquire information on the posture of the electronic device and to be disposed in the housing, and a processor configured to be electrically connected to the first antenna, the second antenna, the communication circuit, and the sensor, wherein the processor operates in a first mode of determining the location of each of a plurality of external electronic devices based on a plurality of signals received from the plurality of external electronic devices located around the electronic device while identifying that the electronic device is in a landscape mode by using the sensor, and operates in a second mode of determining the location of the external electronic device among the plurality of external electronic devices, based on a signal received from the external electronic device located in a direction determined based on the arrangement of the first antenna and the second antenna among the plurality of external electronic devices while identifying that the electronic device is in a portrait mode by using the sensor.

An electronic device and a method for operating the electronic device according to various embodiments may change the mode for providing a location-based service based on the state of the electronic device and the antenna arrangement, thereby providing an improved user experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
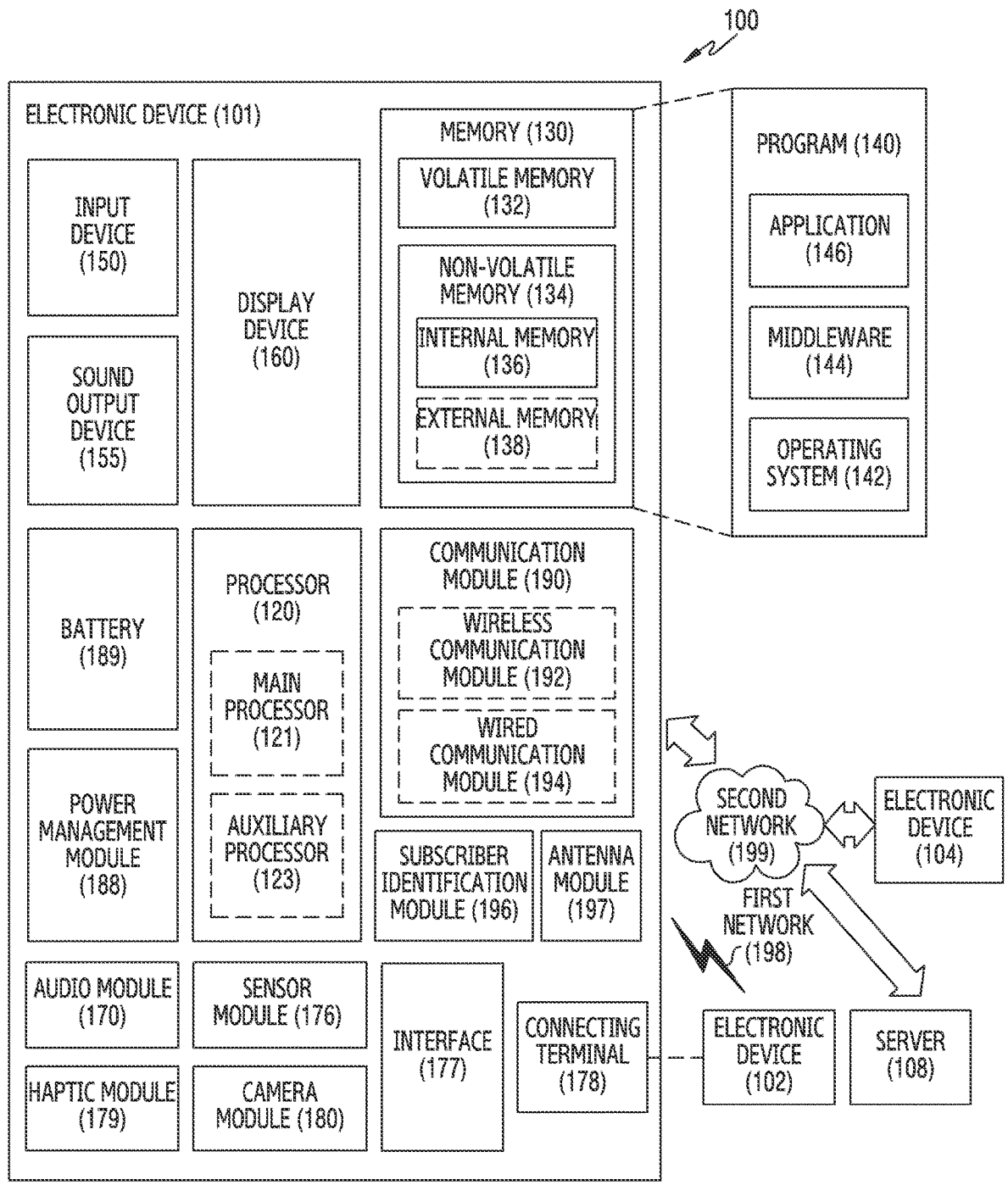
FIG. 1 is a block diagram illustrating an electronic device 101 in a network environment 100 according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following descriptions, an example in which an electronic device 101 provides a location-based service using UWB technology is illustrated, but this is for convenience of description. The electronic device 101 according to various embodiments may provide a location-based service using another wireless communication technology that is different from the UWB technology.

Figure 2A:
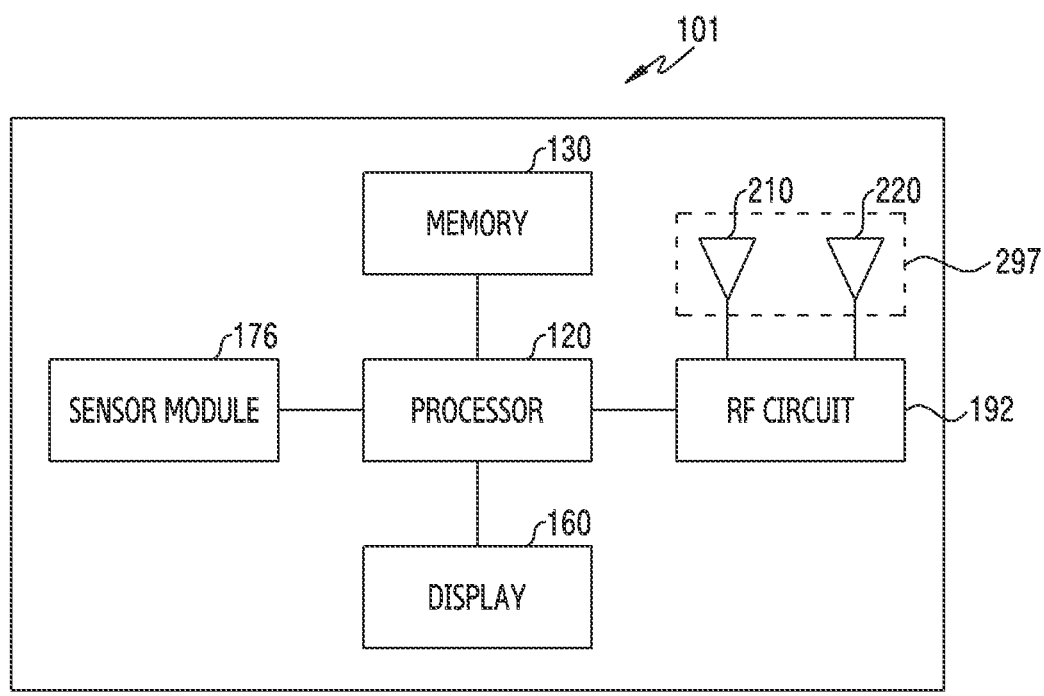
FIG. 2A is a simplified block diagram illustrating an electronic device according to an embodiment of the disclosure.

FIG. 2A is a simplified block diagram illustrating the electronic device 101 according to an embodiment of the disclosure.

Figure 2B:
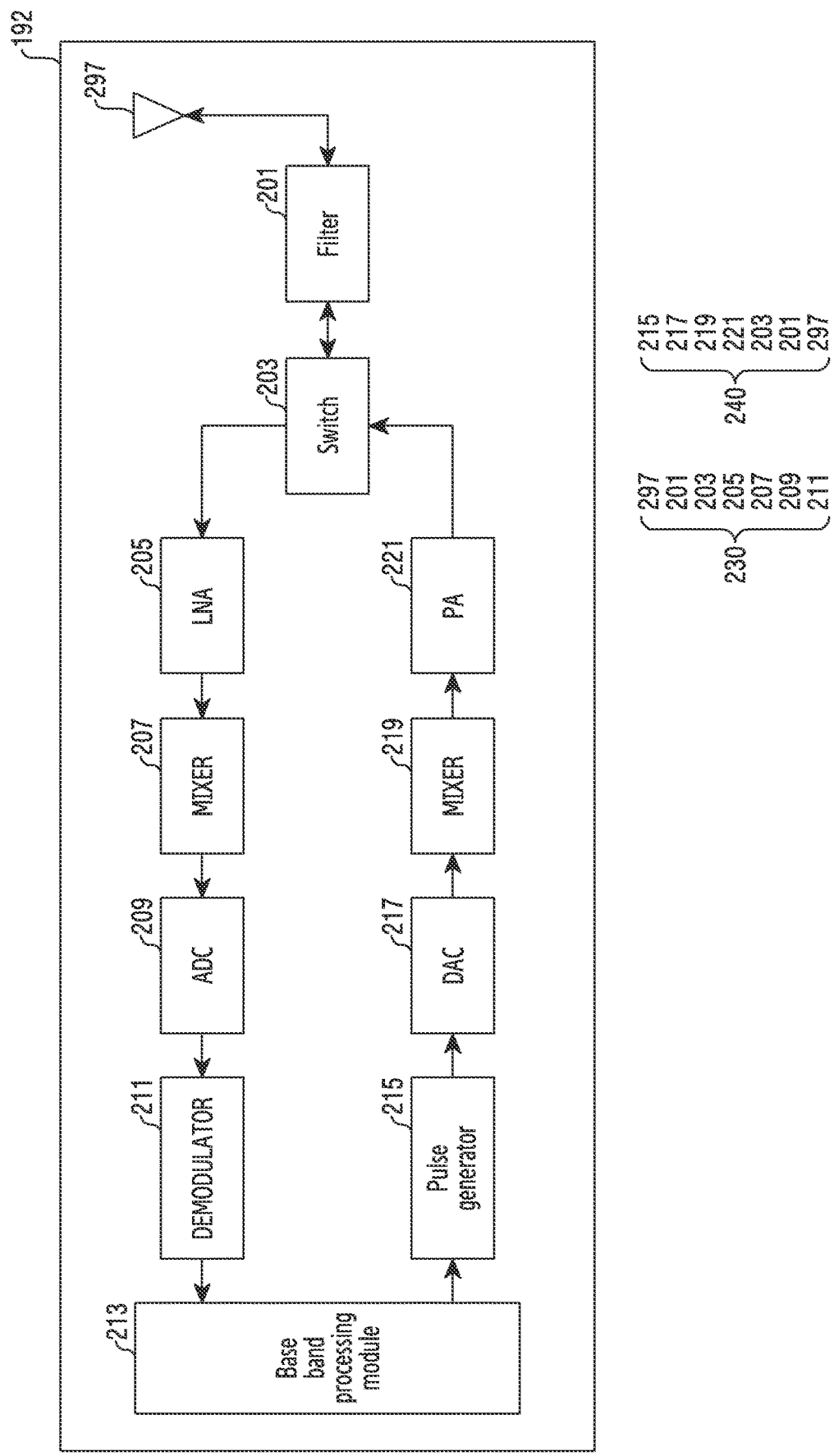
FIG. 2B is a block diagram illustrating an RF circuit according to an embodiment of the disclosure.

FIG. 2B is a block diagram illustrating an RF circuit 192 according to an embodiment of the disclosure.

Figure 3A:
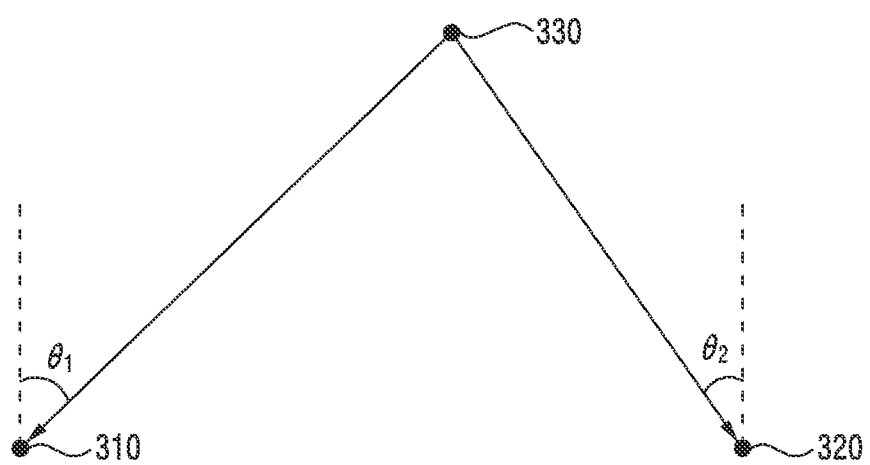
FIG. 3A illustrates a method of measuring a direction of an external electronic device using an angle of arrival of a signal received from the external electronic device to an electronic device according to an embodiment of the disclosure.

FIG. 3A illustrates a method of measuring a direction of an external electronic device using an angle of arrival of a signal received from the external electronic device to an electronic device according to an embodiment of the disclosure.

Figure 3B:
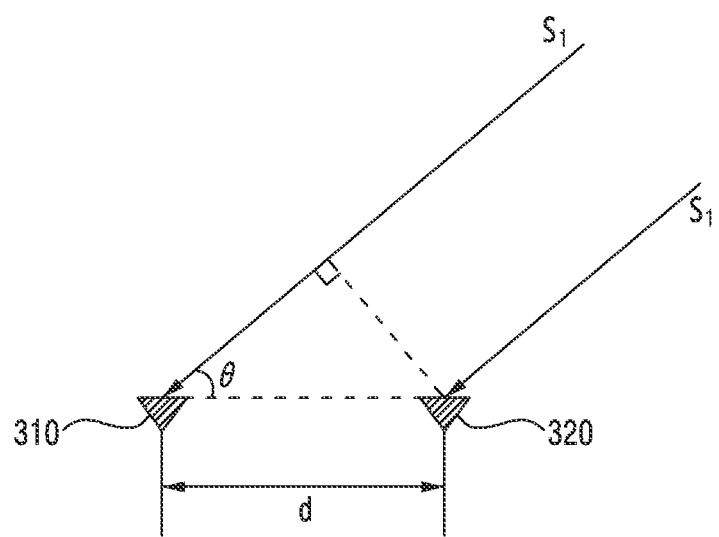
FIG. 3B illustrates a method of measuring a direction of an external electronic device by using a phase difference between signals received from the external electronic device to an electronic device or a time difference at which signals arrive according to an embodiment of the disclosure.

FIG. 3B illustrates a method of measuring a direction of an external electronic device by using a phase difference between signals received from the external electronic device to an electronic device or a time difference at which signals arrive according to an embodiment of the disclosure.

Figure 3C:
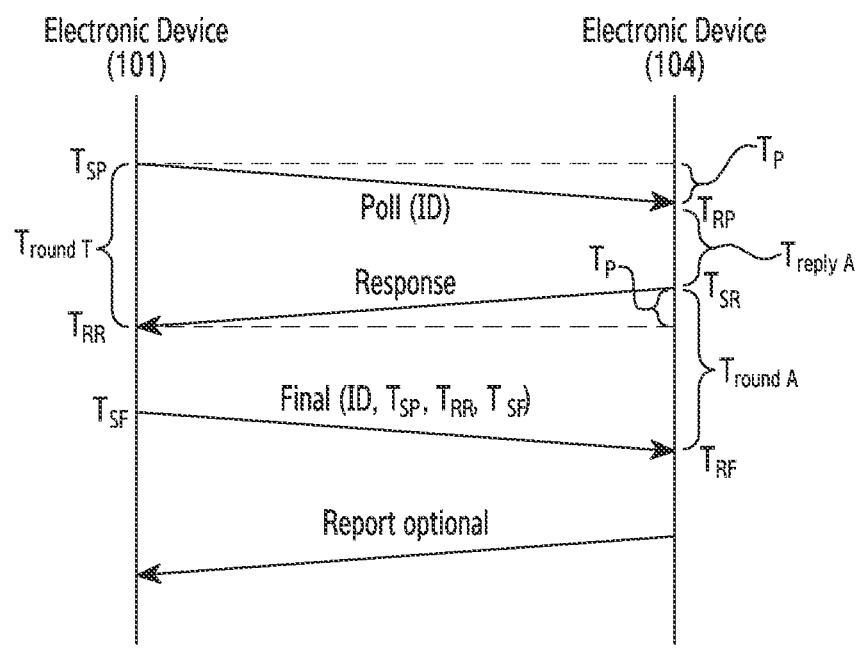
FIG. 3C illustrates a method of measuring a distance between an electronic device and an external electronic device by using a round trip time of a signal transmitted between the electronic device and the external electronic device according to an embodiment of the disclosure.

FIG. 3C illustrates a method of measuring a distance between an electronic device and an external electronic device by using a round trip time of a signal transmitted between the electronic device and the external electronic device according to an embodiment of the disclosure.

Referring to FIG. 2A, the electronic device 101 may include a processor 120 (e.g., the processor 120 of FIG. 1), a sensor module 176 (e.g., the sensor module 176 of FIG. 1), a memory 130 (e.g., the memory 130 of FIG. 1), a display 160 (e.g., the display 160 of FIG. 1), an RF circuit 192 (e.g., the wireless communication module 192 of FIG. 1), and an antenna module 297.

According to various embodiments, the processor 120 may control the overall operation of the electronic device 101 and may process a variety of data received from other components (e.g., the sensor module 176 or the RF circuit 192) of the electronic device 101. For example, the processor 120 may interpret and process a variety of data, instructions, or signals received from the sensor module 176 or the RF circuit 192. The processor 120 may generate new data, instructions, or signals based on the received data, instructions, or signals. The processor 120 may store the generated data, instructions, or signals in the memory 130 or may provide the same to the sensor module 176 or the RF circuit 192. For example, the processor 120 may receive data on the posture of the electronic device 101 from the sensor module 176. The processor 120 may operate the electronic device 101 in a landscape mode or a portrait mode based on the received data. As another example, the processor 120 may receive signals transmitted from external electronic devices through the RF circuit 192. The processor 120 may analyze the phase data and time data of each of the signals based on the received signals. The processor 120 may obtain or generate direction data and distance data of each of the external electronic devices based on the analyzed data. For example, the direction data may refer to data indicating a direction from the electronic device 101 to each of the external electronic devices or data indicating a direction from each of the external electronic devices to the electronic device 101. For example, the distance data may refer to data indicating a distance between the electronic device 101 and each of the external electronic devices.

According to various embodiments, the processor 120 may be electrically coupled or electrically connected to other components of the electronic device 101 (e.g., the sensor module 176, the RF circuitry 192, the display 160, or the memory 130).

According to various embodiments, the processor 120 may include one or more processors. For example, the processor 120 may include one or more of an application processor (AP) for controlling a higher layer program such as an application program, a graphic processing unit (GPU) for controlling the display 160, or a communication processor (CP) for controlling a communication function.

According to various embodiments, the memory 130 may store a variety of data used by the components of the electronic device 101. For example, the memory 130 may store an instruction for controlling the electronic device 101, a control instruction code, control data, or user data.

According to various embodiments, the display 160 may be constituted of a plurality of layers. For example, the display 160 may include a thin film transistor (TFT) layer, an electrode layer, an organic material layer, or a pixel layer. The display 160 may emit light from pixels to the outside. The display 160 may visually provide information to the user through the emitted light. According to various embodiments, the display 160 may include a display panel or a touch panel.

According to various embodiments, the sensor module 176 may detect an operating state of the electronic device 101 or an external environmental state. The sensor module 176 may generate data corresponding to the detected state and may provide the generated data to other components (e.g., the processor 120) of the electronic device 101. For example, the sensor module 176 may detect the posture of the electronic device 101 and may generate data corresponding to the detected posture. The sensor module 176 may provide the generated data to the processor 120.

According to various embodiments, the antenna module 297 may include a plurality of antennas. According to various embodiments, the antenna module 297 may include a first antenna 210 and a second antenna 220. The first antenna 210 and the second antenna 220 may include a feeding portion electrically connected to a printed circuit board and a radiating portion electrically connected to the feeding portion to transmit and receive signals. The antenna module 297 may transmit a signal to the outside or receive a signal from the outside through the first antenna 210 and the second antenna 220. According to various embodiments, the first antenna 210 and the second antenna 220 may be electrically coupled to the RF circuit 192. At least a portion of the antenna module 297 illustrated in FIG. 2A may be included in the antenna module 197 illustrated in FIG. 1. At least a portion of the antenna module 297 may be included in the RF circuit 192.

According to various embodiments, the RF circuit 192 may establish a wireless communication connection between the electronic device 101 and an external electronic device, and may support to perform communication of the established wireless communication connection. In an embodiment, the RF circuit 192 may be operated by one or more processors distinct from the processor 120. In another embodiment, the RF circuit 192 may be operated by the processor 120. The RF circuit 192 may be operated independently of the processor 120 by the CP included in the RF circuit 192. Unlike the above description, the electronic device 101 may further include another communication circuit that is distinct from the RF circuit 192. The electronic device 101 may provide an ultra-wide band (UWB)-based location-based service of an external electronic device using the RF circuit 192, and may establish a wireless connection with the external electronic device using another communication circuit.

According to various embodiments, the electronic device 101 may transmit or receive a UWB signal to and from the outside through the RF circuit 192 and the antenna module 297.

For example, referring to FIG. 2B, the RF circuit 192 may include a UWB receiver 230 and a UWB transmitter 240, and a baseband processing module 213 for transmitting and receiving UWB signals.

According to various embodiments, the UWB receiver 230 may include at least one or more of an antenna module 297, a filter 201, a switch 203, a low noise amplifier (LNA) 205, a first mixer 207, an analog to digital converter (ADC) 209, and an integrator 211.

According to various embodiments, the antenna module 297 may receive a UWB signal from the external electronic device or may transmit a UWB signal to the external electronic device. The antenna module 297 may include an antenna having a wideband characteristic for transmitting and receiving UWB signals. For example, the antenna module 297 may include a patch antenna, a monopole antenna, a dipole antenna, a biconical antenna, a horn antenna, or a spiral antenna, but is not limited thereto.

According to various embodiments, the filter 201 may minimize the loss of transmitted/received signals and may separate signals so that other channels are not affected by the transmitted/received signals. The filter 201 may selectively pass components of a designated frequency band of the transmitted/received signal, and may attenuate components of the remaining frequency bands. According to various embodiments, the RF circuit 192 may include a plurality of filters, and the filter 201 may be variably used according to a frequency to be used.

According to various embodiments, the switch 203 may switch a path of a transmitted/received signal through opening/closing of an internal circuit. According to various embodiments, when the UWB receiver 230 and the UWB transmitter 240 do not share at least a portion of a signal transmission path and are configured as a separate antenna and filter, the switch 203 may not be included in the RF circuit 192.

According to various embodiments, the LNA 205 may amplify a signal received from the outside while minimizing noise included in the signal.

According to various embodiments, the first mixer 207 may convert the center frequency band (or frequency band) of the signal. For example, the first mixer 207 may lower the center frequency band (or frequency band) of the signal transmitted from the LNA 205.

According to various embodiments, the ADC 209 may convert an analog signal into a digital signal that may be interpreted by the processor 120.

According to various embodiments, the demodulator 211 (i.e., integrator 211) may output a signal generated by integrating an input signal for a designated time. The signal passing through the integrator 211 may be output with a relatively high gain in a relatively low frequency band.

According to various embodiments, the UWB signal received from the external electronic device may be sequentially processed in the antenna module 297, the filter 201, the switch 203, the LNA 205, the first mixer 207, the ADC 209, or the integrator 211 and may be restored to a baseband signal, and the baseband signal may be input to the baseband processing module 213. The baseband processing module 213 may process the input baseband signal, may acquire data (e.g., low data for acquiring the distance data or the direction data) and/or information (e.g., information indicating an identifier {ID} of the external electronic device) for a UWB-based location-based service, and may provide the acquired data and/or information to the processor 120.

According to various embodiments, the UWB transmitter 240 may include at least one of a pulse generator 215, a digital to analog converter (DAC) 217, a second mixer 219, a power amplifier 221, the switch 203, the filter 201, and the antenna module 197.

According to various embodiments, the pulse generator 215 may generate a pulse in the time axis for a spectrum of a specific frequency band.

According to various embodiments, the DAC 217 may convert a digital signal into an analog signal.

According to various embodiments, the second mixer 219 may convert a center frequency band of a signal. The second mixer 219 may increase the center frequency band of the signal transmitted from the DAC 217.

According to various embodiments, the power amplifier 221 may amplify the power of a signal so that the signal may reach a desired point by emitting the signal at an appropriate maximum power.

According to various embodiments, the baseband signal processed by the baseband processing module 213 may be sequentially processed in the pulse generator 215, the DAC 217, the second mixer 219, the power amplifier 221, the switch 203, the filter 201, and the antenna module 297, may be modulated to a UWB signal, and may be transmitted to the external electronic device.

Although not shown in FIG. 2B, the RF circuit 192 may further include an oscillator, a synthesizer, or a comparator according to embodiments.

According to various embodiments, the components of the RF circuit 192 may be operatively coupled or electrically connected to each other.

According to various embodiments, the electronic device 101 or the processor 120 of the electronic device 101 may detect the location of the external electronic device through the UWB signal. In another embodiment, the antenna module 297 may include at least one processor distinct from the processor 120, and the location of the external electronic device may be detected by the at least one processor based on the UWB signal. In another embodiment, at least one processor included in the antenna module 297 may generate data or information including time information based on the UWB signal, and may provide the data or the information to the processor 120 of the electronic device 101. The processor 120 may detect the location of the external electronic device based on the data or information provided from the at least one processor of the antenna module 297. Methods in FIGS. 3A to 3C described below will be described with reference to the electronic device 101 or the processor 120 of the electronic device 101, but like the one or more embodiments described above, the methods in FIGS. 3A to 3C may be performed by the at least one processor of the electronic device 101 and/or the at least one processor of the antenna module 297.

In an embodiment, the electronic device 101 or the processor 120 of the electronic device 101 may use a location measurement method such as angle of arrivals (AoA) or time of arrival (TOA) to detect the location of the external electronic device.

For example, referring to FIG. 3A, an electronic device (e.g., the electronic device 101 of FIG. 2A) may include a first antenna 310 and a second antenna 320. The first antenna 310 and the second antenna 320 may receive signals transmitted from the external electronic device 330. Angles $\theta_1$ and $\theta_2$ of the signals received from the external electronic device 330 may be calculated using the arrangement of the first antenna 310 and the second antenna 320, respectively. The electronic device may calculate the direction of the external electronic device 330 based on the calculated angles $\theta_1$ and $\theta_2$.

For another example, referring to FIG. 3B, an electronic device (e.g., the electronic device 101 of FIG. 2A) may receive signals $s_t$ from an external electronic device through the first antenna 310 and the second antenna 320. When the phase difference of the signals, $s_1$ arriving at the first antenna 310 and the second antenna 320 is measured, an angle θ at which the signal $s_1$ is received may be obtained through Equation 1 below.

$$\phi = \frac{2\pi}{\lambda} d \sin \theta \qquad \text{Equation 1}$$

In Equation 1, Φ denotes a phase difference between the signal $s_1$ received by the first antenna 310 and the signal $s_1$ received by the second antenna 320, λ denotes the wavelength of the signal $s_1$, and d denotes a distance between the first antenna 310 and the second antenna 320.

For another example, when a time difference between the signals $S_1$ arriving at the first antenna 310 and the second antenna 320 is measured, the angle θ at which the signal $S_1$ is received may be obtained through Equation 2 below.

$$t = \frac{d}{c} \sin \theta \qquad \text{Equation 2}$$

In Equation 2, t denotes a time difference at which the signal $s_1$ arrives at the first antenna 310 and the second antenna 320, respectively, and c denotes the speed of the signal $s_1$.

According to various embodiments, the electronic device may calculate the direction of the external electronic device based on the calculated angle θ.

For another example, referring to FIG. 3C, a distance between two electronic devices may be calculated using a two way ranging (TWR) method in which signals are exchanged between the electronic device 101 and the electronic device 104. The electronic device 101 may be referred to as a tag device, and the electronic device 104 may be referred to as an anchor device. The electronic device 101 may transmit a poll signal to the electronic device 104. The electronic device 104 having received the poll signal may transmit a response signal to the electronic device 101. The electronic device 101 having received the response signal may transmit a final signal to the electronic device 104. $T_{round\ T}$, which is a round trip time (RTT) of the signal transmitted from the electronic device 101, may be measured through a time Tsp at which the poll signal is transmitted and a time $T_{RR}$ at which the response signal is received. $T_{reply\ A}$, which is the response delay time of the electronic device 104, may be measured through the time $T_{RP}$ at which the poll signal is received and the time $T_{SR}$ at which the response signal is transmitted. Since the electronic device 104 may transmit the values of $T_{RP}$ and $T_{SR}$ together with the response signal, the electronic device 101 may calculate $T_{reply\ A}$ of the electronic device 104. $T_{round\ A}$, which is the RTT of the signal transmitted from the electronic device 104, may be measured through the time $T_{SR}$ at which the response signal is transmitted and a time $T_{RF}$ at which the final signal is received. $T_P$, which is a time of arrival (TOA), which is an arrival time of a signal between the electronic device 101 and the electronic device 104, may be calculated through Equation 3 below.

$$t_P = \frac{t_{round\ T} - t_{reply\ A}}{2} \quad \text{Equation 3}$$

The distance between the electronic device 101 and the electronic device 104 may be calculated using $T_p$ and the speed of the signal.

Figure 4:
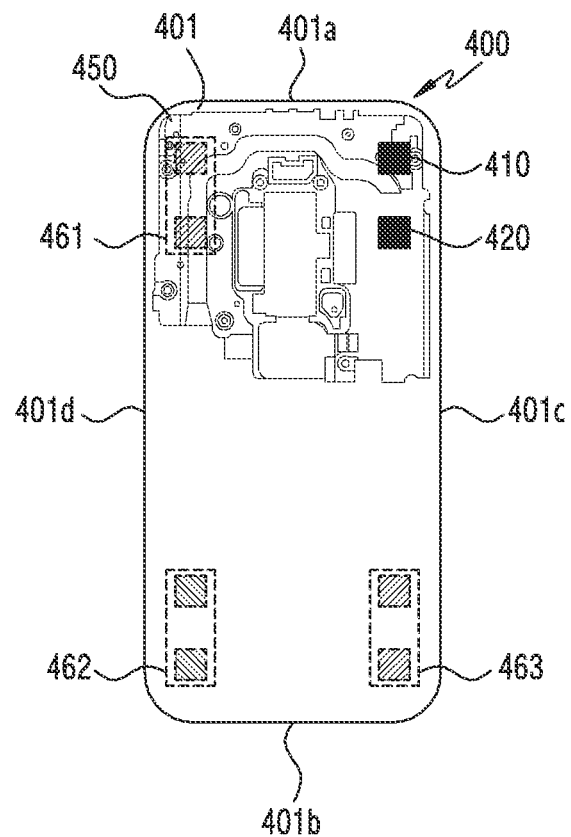
FIG. 4 illustrates an electronic device including a plurality of antennas according to an embodiment of the disclosure.

FIG. 4 illustrates an electronic device including a plurality of antennas according to an embodiment of the disclosure.

Referring to FIG. 4, an electronic device 400 (e.g., the electronic device 101 of FIG. 2A) may include a housing 401, a first antenna 410 (e.g., the first antenna 210 of FIG. 2A), and a second antenna 420 (e.g., the second antenna 220 of FIG. 2A).

According to various embodiments, the housing 401 may form front and rear surfaces of the electronic device 400 and side surfaces surrounding the front and rear surfaces thereof.

According to various embodiments, the side surface of the electronic device 400 may form, define, or include a first edge 401a, a second edge 401b substantially parallel to the first edge 401a, a third edge 401c extending from one end of the first edge 401a to one end of the second edge 401b and longer than the first edge 401a, and a fourth edge 401d extending from the other end of the first edge 401a to the other end of the second edge 401b.

According to various embodiments, the first antenna 410 may be spaced apart from the first edge 401a and the third edge 401c, respectively, and may be disposed inside the housing 401. The first antenna 410 may be disposed closer to the first edge 401a than to the second edge 401b. The first antenna 410 may be disposed closer to the third edge 401c than to the fourth edge 401d.

According to various embodiments, the second antenna 420 may be spaced apart from the first antenna 410 and the third edge 401c, respectively, and may be disposed inside the housing 401. The second antenna 420 may be disposed closer to the first edge 401a than to the second edge 401b. The second antenna 420 may be disposed closer to the third edge 401c than to the fourth edge 401d. The second antenna 420 may be disposed between the first antenna 410 and the second edge 401b.

According to various embodiments, the first antenna 410 and the second antenna 420 may be spaced apart from the third edge 401c by a designated distance. A straight line passing through the first antenna 410 and the second antenna 420 may be substantially parallel to the third edge 401c. The straight line may be a line segment passing through the center of the feeding portion or the center of the radiating portion of the first antenna 410 and the second antenna 420.

According to various embodiments, the first antenna 410 and the second antenna 420 may be spaced apart by a designated distance. For example, the first antenna 410 and the second antenna 420 may be spaced apart by a distance corresponding to half the wavelength of a signal transmitted and received through an antenna module (e.g., the antenna module 297 of FIG. 2A).

According to various embodiments, the electronic device 400 may further include a bracket 550. The bracket 450 may be disposed inside the housing 401 to support other components of the electronic device 400. In an embodiment, when the first antenna 410 and the second antenna 420 are provided as a patch antenna, the first antenna 410 and the second antenna 420 may be disposed on the bracket 450. In another embodiment, the first antenna 410 and the second antenna 420 may be provided as different types of antennas other than the patch antenna. However, even in this case, relative positions between the first antenna 410, the second antenna 420, and the housing 401 may be substantially the same.

According to various embodiments, the description of the positions of the first antenna 410 and the second antenna 420 shown in FIG. 4 may be provided to describe the arrangement of the first antenna 410 and the second antenna 420 inside the electronic device 400. For example, the first antenna 410 and the second antenna 420 may be disposed in different positions (e.g., areas 461, 462, and 463) of the housing 401 in the same arrangement as shown in FIG. 4.

Figure 5:
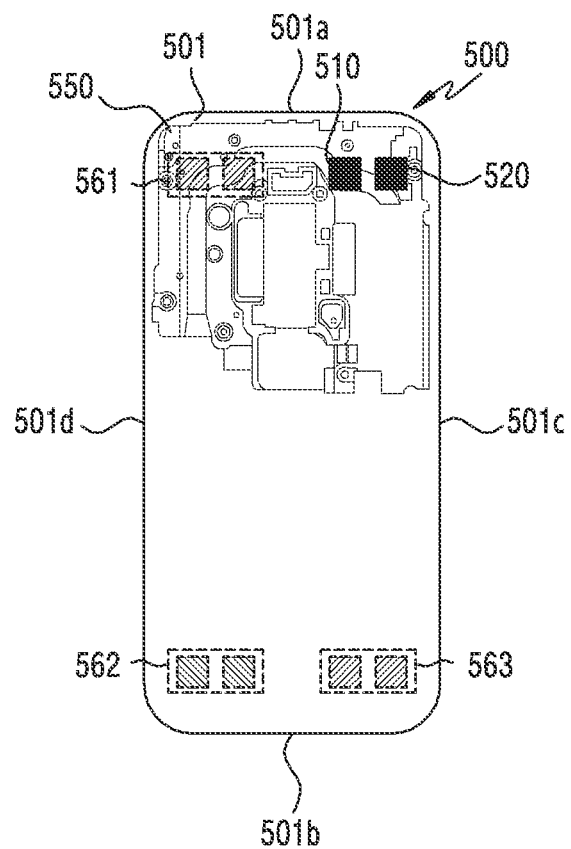
FIG. 5 illustrates an electronic device including a plurality of antennas according to an embodiment of the disclosure.

FIG. 5 illustrates an electronic device including a plurality of antennas according to an embodiment of the disclosure.

Referring to FIG. 5, an electronic device 500 (e.g., the electronic device 101 of FIG. 2A) may include a housing 501, a first antenna 510 (e.g., the first antenna 210 of FIG. 2A), and a second antenna 520 (e.g., the second antenna 220 of FIG. 2A).

According to various embodiments, the housing 501 may form front and rear surfaces of the electronic device 500 and side surfaces surrounding the front and rear surface thereof.

According to various embodiments, the side surface of the electronic device 500 may form, define, or include a first edge 501a, a second edge 501b substantially parallel to the first edge 501a, a third edge 501c extending from one end of the first edge 501a to one end of the second edge 501b and longer than the first edge 501a, and a fourth edge 501d extending from the other end of the first edge 501a to the other end of the second edge 501b.

According to various embodiments, the first antenna 510 may be spaced apart from the first edge 501a and the third edge 501c, respectively, and may be disposed inside the housing 501. The first antenna 510 may be disposed closer to the first edge 501a than to the second edge 501b. The first antenna 510 may be disposed closer to the third edge 501c than to the fourth edge 501d.

According to various embodiments, the second antenna 520 may be spaced apart from the first edge 510a and the third edge 501c, respectively, and may be disposed inside the housing 501. The second antenna 520 may be disposed closer to the first edge 501a than to the second edge 501b. The second antenna 520 may be disposed closer to the third edge 501c than to the fourth edge 501d. The second antenna 520 may be disposed between the first antenna 510 and the third edge 501c.

According to various embodiments, the first antenna 510 and the second antenna 520 may be spaced apart from the first edge 501a by a designated distance. A straight line passing through the first antenna 510 and the second antenna 520 may be substantially parallel to the first edge 501a. The straight line may be a line segment passing through the center of the feeding portion or the center of the radiating portion of the first antenna 510 and the second antenna 520.

According to various embodiments, the first antenna 510 and the second antenna 520 may be spaced apart by a designated distance. For example, the first antenna 510 and the second antenna 520 may be spaced apart by a distance corresponding to half the wavelength of a signal transmitted and received through an antenna module (e.g., the antenna module 297 of FIG. 2A).

According to various embodiments, the electronic device 500 may further include a bracket 550. The bracket 550 may be disposed inside the housing 501 to support other components of the electronic device 500. In an embodiment, when the first antenna 510 and the second antenna 520 are provided as patch antennas, the first antenna 510 and the second antenna 520 may be disposed on the bracket 550. In another embodiment, the first antenna 510 and the second antenna 520 may be provided as different types of antennas other than the patch antenna. However, even in this case, the relative positions between the first antenna 510, the second antenna 520, and the housing 501 may be substantially the same.

According to various embodiments, the description of the positions of the first antenna 510 and the second antenna 520 shown in FIG. 5 may be provided to describe the arrangement of the first antenna 510 and the second antenna 520 inside the electronic device 500. For example, the first antenna 510 and the second antenna 520 may be disposed in different positions (e.g., areas 561, 562, and 563) of the housing 501 in the same arrangement as shown in FIG. 5.

Figure 6:
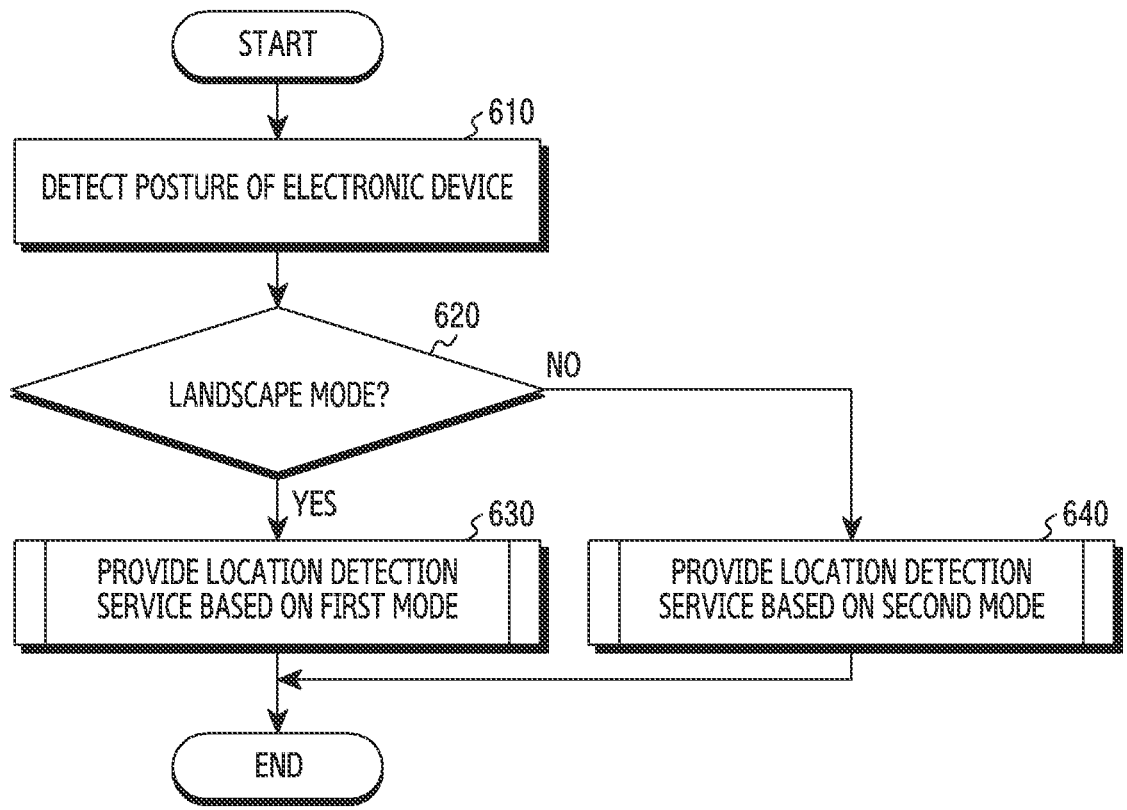
FIG. 6 is a flowchart illustrating a method of providing a location-based service according to an embodiment of the disclosure.

FIG. 6 is a flowchart illustrating a method of providing a location-based service according to an embodiment of the disclosure. The method of FIG. 6 and various embodiments of a location-based service to be described later may be executed by the electronic device 400 shown in FIG. 4, the processor 120 of the electronic device 400, the electronic device 500 shown in FIG. 5, or the processor 120 of the electronic device 500. The description of FIG. 6 and descriptions of various embodiments of the location-based service, which will be described later, have been described with reference to the electronic device 400 shown in FIG. 4, but this is for convenience of description.

Figure 7A:
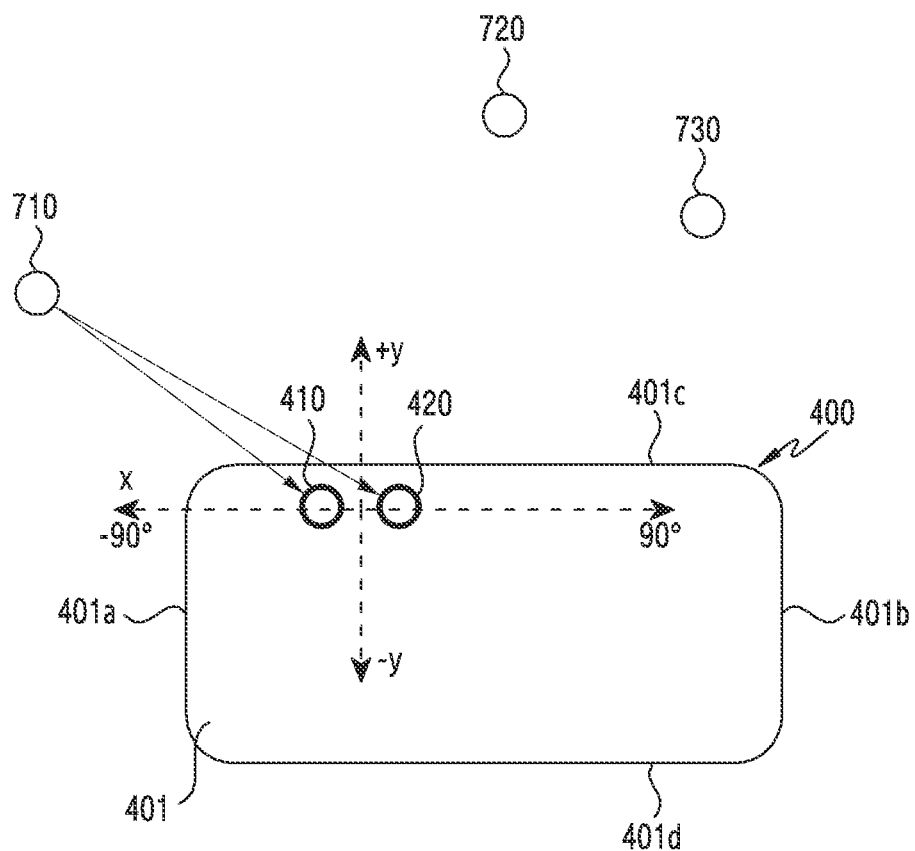
FIG. 7A illustrates an electronic device operating in a first mode according to an embodiment of the disclosure.

FIG. 7A illustrates an electronic device operating in a first mode according to an embodiment of the disclosure.

Figure 7B:
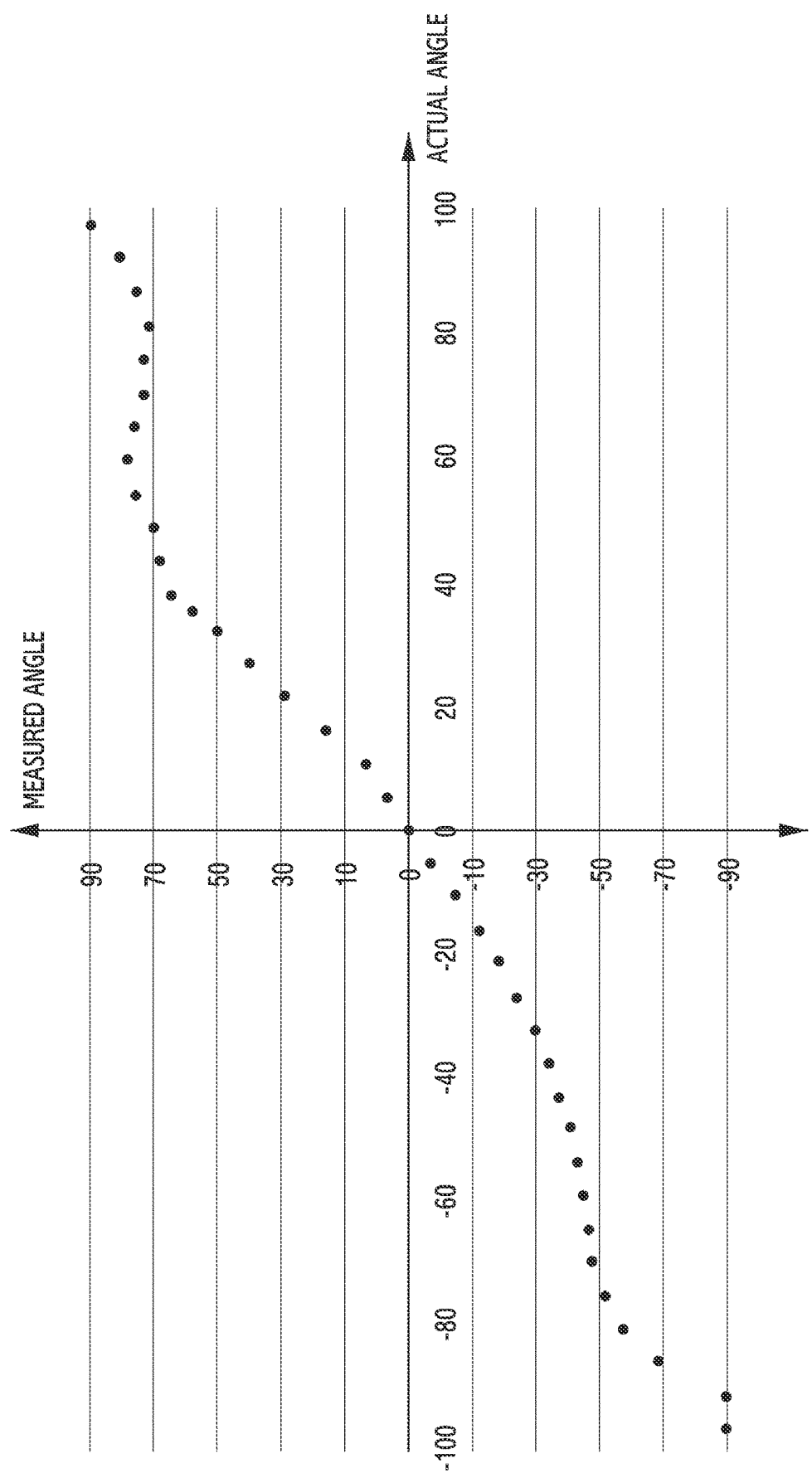
FIG. 7B is a graph illustrating an angle of an external electronic device detected by an electronic device operating in a first mode according to an embodiment of the disclosure.

FIG. 7B is a graph illustrating an angle of an external electronic device detected by an electronic device operating in a first mode according to an embodiment of the disclosure.

Figure 8:
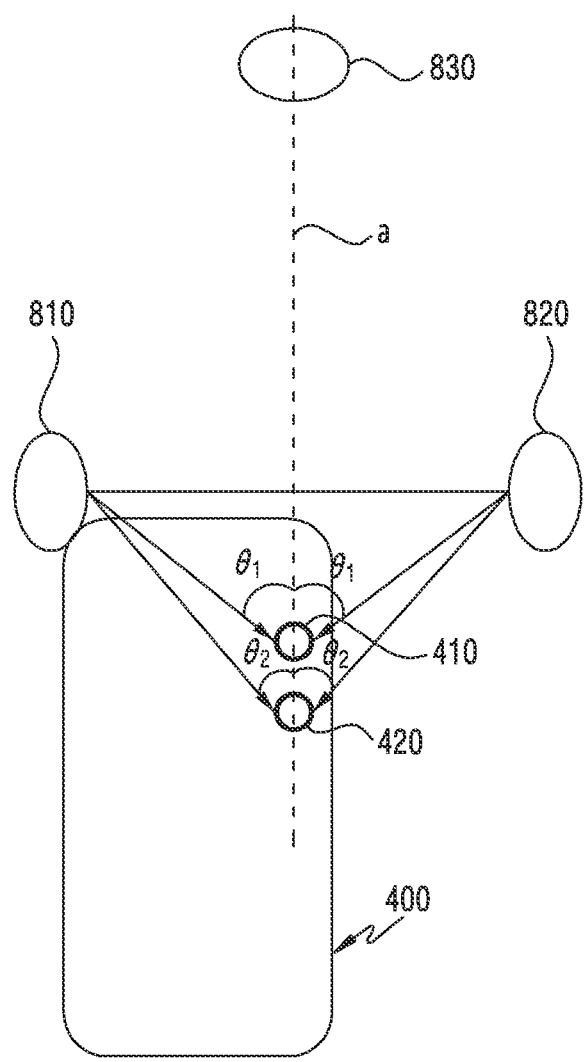
FIG. 8 illustrates an electronic device operating in a second mode according to an embodiment of the disclosure.

FIG. 8 illustrates an electronic device operating in a second mode according to an embodiment of the disclosure.

Referring to FIG. 6, in operation 610, the processor 120 may detect the posture of the electronic device 400. For example, the sensor module 176 may detect the posture of the electronic device 400 and may generate data corresponding to the detected state. The sensor module 176 may provide the generated data to the processor 120. The processor 120 may detect the posture of the electronic device 400 based on the provided data.

In operation 620, the processor 120 may identify whether the electronic device 400 is in a landscape mode or a portrait mode based on the posture of the electronic device 400 detected in operation 610. According to various embodiments, when it is identified that the electronic device 400 is in the landscape mode, the processor 120 may perform operation 630, otherwise, the processor 120 may perform operation 640.

In this disclosure, the landscape mode may be referred to as a landscape state, and the portrait mode may be referred to as a portrait state.

In operation 630, the processor 120 may provide a location-based service based on the first mode, based on identifying that the electronic device 400 is in the landscape mode.

Referring to FIG. 7A, the electronic device 400 may provide location-based services to external electronic devices 710, 720, and 730 positioned in the vicinity of the electronic device 400 based on the first mode. According to various embodiments, the electronic device 400 may receive UWB signals transmitted by the plurality of external electronic devices 710, 720, and 730, respectively. For example, the RF circuit 192 of the electronic device 400 may receive the UWB signals of the plurality of external electronic devices 710 through the first antenna 410 and the second antenna 420. The RF circuit 192 may demodulate the received UWB signal into a baseband signal by despreading the received UWB signal. The processor 120 may extract data on time, phase, and angle of the signal transmitted by the external electronic device 710 based on the baseband signal. The processor 120 may determine the location of the external electronic device 710 based on the extracted data. The processor 120 may perform operations corresponding to the above description of the location of the external electronic device 710 on each of the external electronic device 720 and the external electronic device 730, thereby determining the locations of the external electronic device 720 and the external electronic device 730.

According to various embodiments, while operating in the first mode, the electronic device 400 may detect the location of the external electronic device located within a designated angular range from the electronic device 400.

Referring to FIGS. 7A and 7B, the electronic device 400 may detect the location of each of the external electronic devices positioned in the range of −90° to +90° with respect to a +y axis perpendicular to the third edge 401c. The electronic device 400 may delay or abandon processing of each of signals received from the external electronic devices positioned in a range of −90° to +90° with respect to a −y axis. The description of the above-described designated angle range does not limit the location detection range of the electronic device 400. The designated angle range may vary depending on the arrangement of the first antenna 410 and the second antenna 420, and may be determined by configuring an angle range for delaying or ignoring the signals received from the external electronic devices. The electronic device 400 may determine the coverage of the first mode according to the designated angle range.

In operation 640, the processor 120 may provide a location detection service based on the second mode based on identifying that the electronic device 400 is in the portrait mode.

Referring to FIG. 8, the electronic device 400 may provide a location-based service to external electronic devices 810, 820, and 830 positioned in the vicinity of the electronic device 400 based on the second mode. The coverage of the second mode may be an area corresponding to dotted line a passing through the first antenna 410 and the second antenna 420. For example, the electronic device 400 may provide the location-based service to the external electronic device 830 positioned in a direction corresponding to the dotted line a. For example, the electronic device 400 operating in the second mode may provide the location-based service to the external electronic device 830 positioned in the direction corresponding to the dotted line among the external electronic devices 810, 820, and 830 positioned in the vicinity of the electronic device 400, and may restrict the provision of the location-based service to the external electronic device 810 and the external electronic device 820 which are separated or spaced apart from the dotted line a. For example, the electronic device 400 operating in the second mode may provide the location-based service only to the external electronic device 830 among the external electronic devices 810, 820, and 830.

For example, the electronic device 400 operating in the second mode may receive a UWB signal from the external electronic devices 810, 820, and 830 positioned in the vicinity of the electronic device 400, respectively. In the electronic device 400 operating in the second mode, when a distance from each of the external electronic devices 810 and 820 to the dotted line a and a distance to the first antenna 410 are the same, data obtained based on the signals received from the external electronic devices 810 and 820 may be the same. In the electronic device 400 operating in the second mode, it is difficult to distinguish whether the signal received from the external electronic device 810 is received from the external electronic device 810 or the external electronic device 820 due to the identity of the data, or it is difficult to distinguish whether the signal received from the external electronic device 820 is received from the external electronic device 810 or the external electronic device 820. The electronic device 400 operating in the second mode may process the UWB signal received from the external electronic device 830 positioned in the direction corresponding to the dotted line a, and may ignore, delay, or abandon the processing of the UWB signal received from the remaining external electronic devices 810 and 820 positioned outside the coverage of the second mode.

According to various embodiments, the processor 120 of the electronic device 400 may process the UWB signal received from the external electronic device 830 located within the coverage of the second mode. For example, the RF circuit 192 of the electronic device 400 may despread the UWB signal received from the external electronic device 830 through the first antenna 410 and the second antenna 420 into a baseband signal. The processor 120 may extract data on time, phase, and angle of a signal transmitted by the external electronic device 830 based on the baseband signal of the external electronic device 830. The processor 120 may determine the location of the external electronic device 830 based on the extracted data.

Figure 9A:
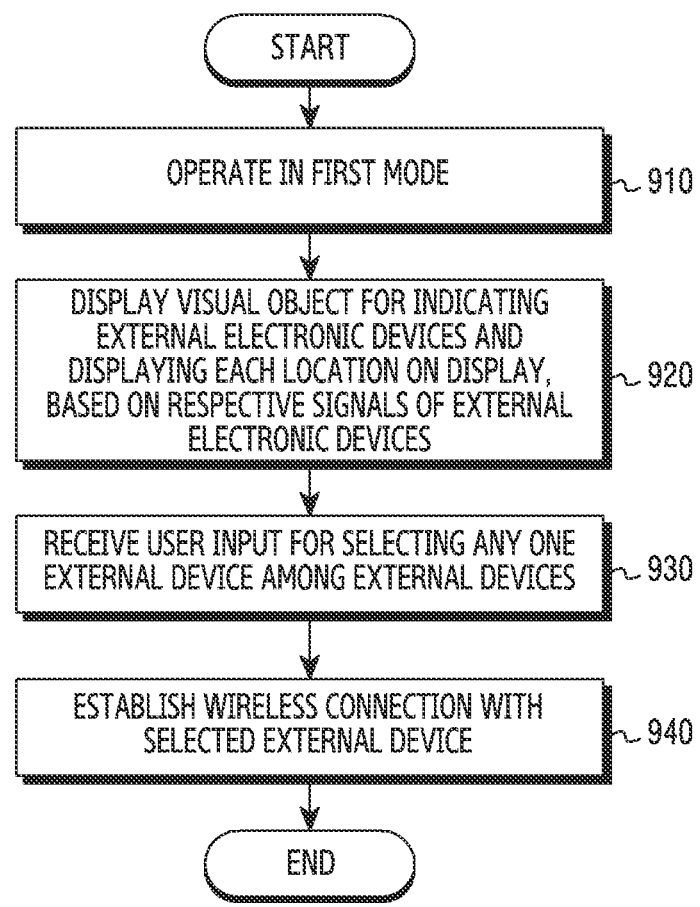
FIG. 9A is a flowchart illustrating a method of providing a location-based service based on a first mode according to an embodiment of the disclosure.

FIG. 9A is a flowchart illustrating a method of providing a location-based service based on a first mode according to an embodiment of the disclosure.

Figure 9B:
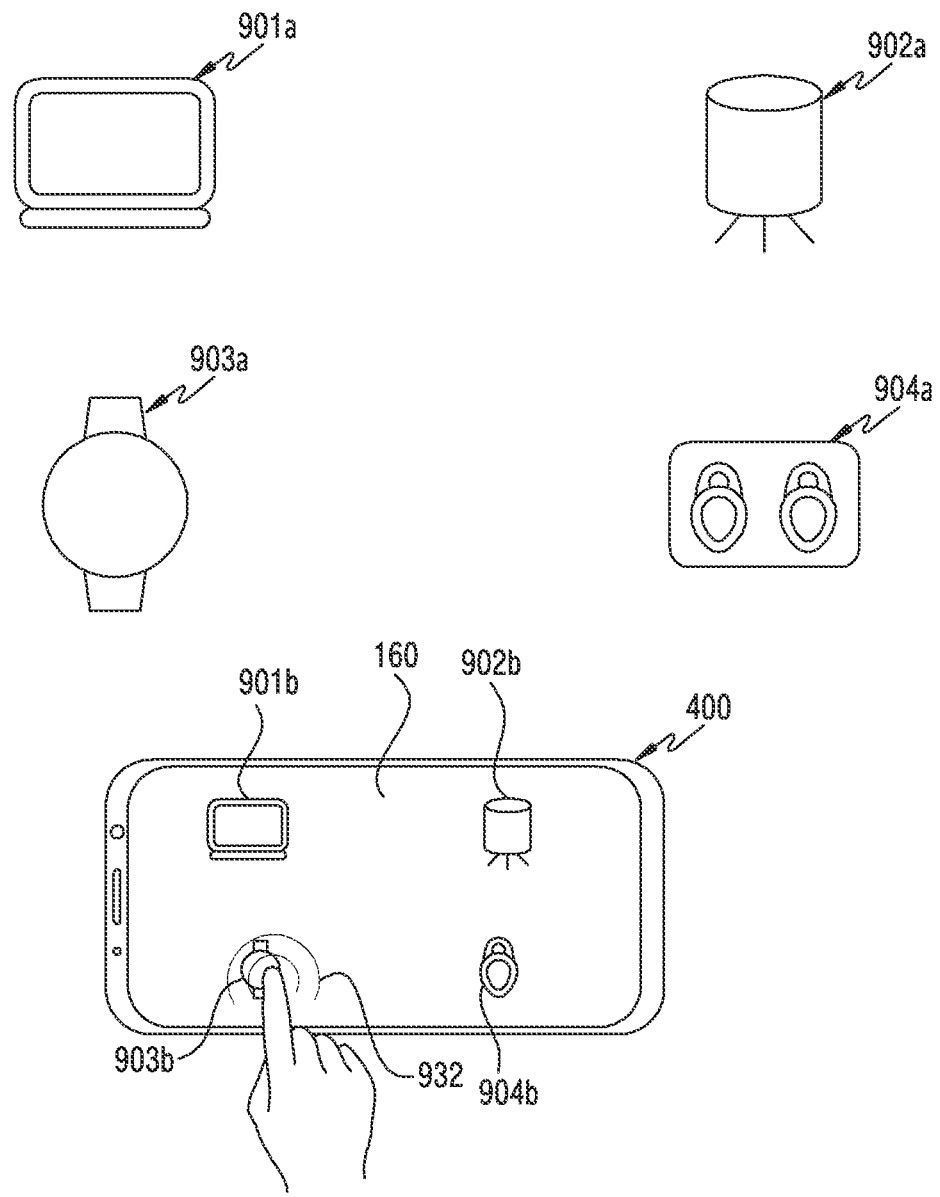
FIG. 9B is a diagram illustrating a location-based service provided based on a first mode according to an embodiment of the disclosure.

FIG. 9B is a diagram illustrating a location-based service provided based on a first mode according to an embodiment of the disclosure.

Operations 910 to 940 of FIG. 9A may be related to operation 630 of FIG. 6.

Referring to FIG. 9A, in operation 910, the processor 120 of the electronic device 400 may operate in a first mode. For example, operation 910 may correspond to operation 630 of FIG. 6. For example, the processor 120 may receive signals from external electronic devices located within a designated angular range from the electronic device 400 based on identifying that the electronic device 400 is in the landscape mode. The processor 120 may identify or detect the location of each of the external electronic devices based on the received signals.

In operation 920, the processor 120 may instruct the external electronic devices based on the signals of each of the external electronic devices, and may display visual objects for indicating the location of each of the external electronic devices on the display 160. For example, the visual object may correspond to each of the external electronic devices, and may be displayed at a location within a display area of the display 160 corresponding to the location of each of the external electronic devices. In an embodiment, the visual object corresponding to the external electronic device may include an image and text, but is not limited thereto.

Referring to FIG. 9B, the processor 120 operating in the first mode may determine the location of each of the external electronic devices based on the respective signals received from the external electronic devices. For example, the processor 120 operating in the first mode may determine the location of an external electronic device 901a based on the signal received from the external electronic device 901a. For example, the processor 120 operating in the first mode may determine the location of an external electronic device 902a based on a signal received from the external electronic device 902a. For example, the processor 120 operating in the first mode may determine the location of an external electronic device 903a based on a signal received from the external electronic device 903a. For example, the processor 120 operating in the first mode may determine the location of an external electronic device 904a based on a signal received from the external electronic device 904a.

According to an embodiment, the processor 120 may display a visual object indicating the location of each of the external electronic devices 901a, 902a, 903a, and 904a on the display 160. For example, the processor 120 may display visual objects 901b, 902b, 903b, and 904b at positions on the display area of the display 160 corresponding to the positions of the external electronic devices 901a, 902a, 903a, and 904a, respectively, based on the respective distances and angles of the external electronic devices 901a, 902a, 903a, and 904a from the electronic device 400 determined based on the signals received from the determined external electronic devices 901a, 902a, 903a, and 904a, respectively. The processor 120 may identify the respective positions of the external electronic devices 901a, 902a, 903a, and 904a, and may display the visual objects 901b, 902b, 903b, and 904b corresponding to the external electronic devices 901a, 902a, 903a, and 904a, respectively, on the display area of the display 160 so that the relative positions of the electronic device 400 and the external electronic devices 901a, 902a, 903a, and 904a may be displayed.

In an embodiment, the processor 120 may display the visual objects 901b, 902b, 903b, and 904b for indicating each of the external electronic devices 901a, 902a, 903a, and 904a on the display 160. Each of the signals transmitted by the external electronic devices 901a, 902a, 903a, and 904a may include information for indicating an identifier (ID) of each of the external electronic devices 901a, 902a, 903a, and 904a. The processor 120 may determine each of the visual objects to be displayed on the display 160 based on the ID of each of the external electronic devices 901a, 902*a*, 903*a*, and 904*a*. In an embodiment, the processor 120 may determine each of the visual objects to be displayed on the display 160 based on the information for identifying the ID of each of the external electronic devices 901*a*, 902*a*, 903*a*, and 904*a* and data on the visual objects corresponding to the IDs, respectively. The data on each of the visual objects corresponding to each ID may be at least one of data stored in the memory of the electronic device 400, data provided from an external server, and data provided along with the signals received from the external electronic devices.

The following examples have been described with reference to the external electronic device 901*a*, but may be applied to the external electronic device 902*a*, the external electronic device 903*a*, and the external electronic device 904*a*.

The processor 120 may display the visual object 901*b* corresponding to the shape of the external electronic device 901*a* on the display area of the display 160 corresponding to the position of the external electronic device 901*a*, based on the signal received from, for example, the external electronic device 901*a*.

For example, the processor 120 may display a visual object for indicating the name of the external electronic device 901*a* on the display 160 based on the signal received from the external electronic device 901*a*.

For example, the processor 120 may display a visual object for indicating the type of the external electronic device 901*a* on the display 160 based on the signal received from the external electronic device 901*a*.

For example, the processor 120 may display a visual object for indicating a history in which the external electronic device 901*a* establishes a wireless connection with the electronic device 400, based on the signal received from the external electronic device 901*a*.

In operation 930, the processor 120 may receive a user input 932 for selecting any one of the external electronic devices 901*a*, 902*a*, 903*a*, and 904*a*.

In operation 940, the processor 120 may establish a wireless connection with the selected external device based on the user input. For example, referring to FIG. 9B, when receiving a touch input 932 (i.e., user input 932) for any one visual object 903*b* of the visual objects 901*b*, 902*b*, 903*b*, and 904*b* displayed on the display 160, the processor 120 may determine that the external electronic device 903*a* indicated by the visual object 903*b* is selected among the external electronic devices 901*a*, 902*a*, 903*a*, and 904*a*. The processor 120 may establish the wireless connection with the selected external electronic device 903*a* using the RF circuit 192. The processor 120 may transmit and receive signals, data, or instructions to and from the external electronic device 903*a* in which the wireless connection is established. The processor 120 may control the external electronic device 903*a* in which the wireless connection is established or may receive information about the external electronic device 903*a* in which the wireless connection is established. Unlike the above description, the electronic device 400 may include another communication circuit that is distinct from the RF circuit 192. The wireless connection may include a wireless connection using Bluetooth or Wi-Fi, but is not limited thereto. The processor 120 may provide the location-based service through the RF circuit 192 and may establish a wireless connection with the external electronic device through another communication circuit distinct from the RF circuit 192.

Figure 10A:
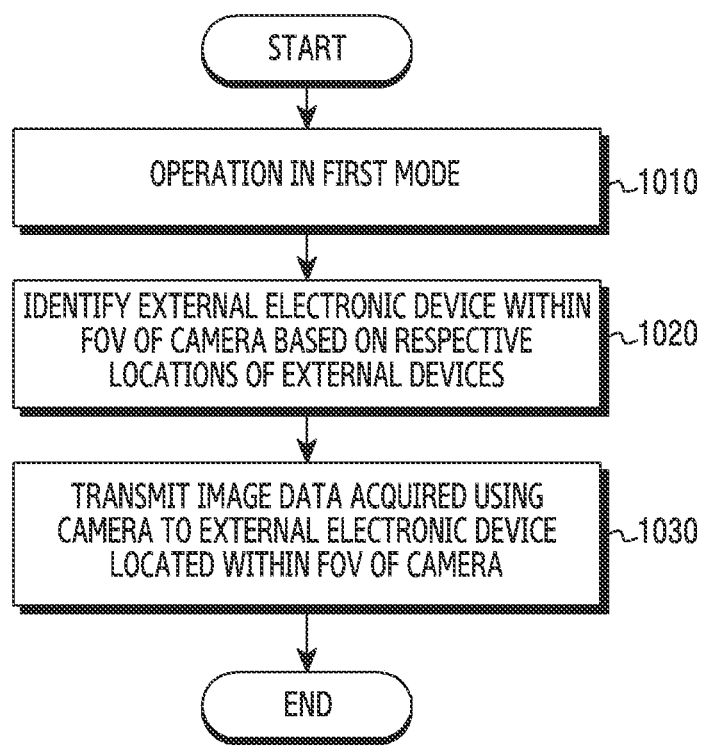
FIG. 10A is a flowchart illustrating a method of providing a location-based service based on a first mode according to an embodiment of the disclosure.

FIG. 10A is a flowchart illustrating a method of providing a location-based service based on a first mode according to an embodiment of the disclosure.

Figure 10B:
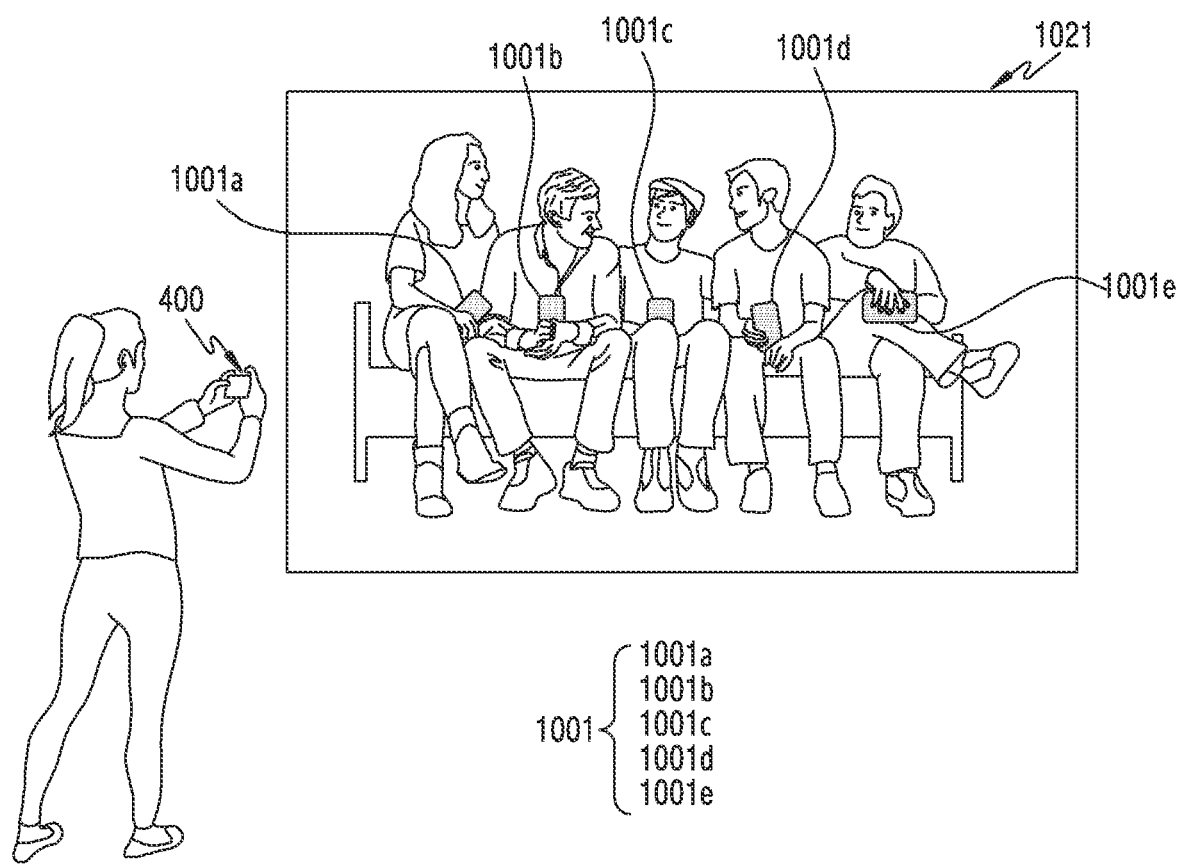
FIG. 10B is a diagram illustrating a location-based service provided based on a first mode according to an embodiment of the disclosure.

FIG. 10B is a diagram illustrating a location-based service provided based on a first mode according to an embodiment of the disclosure.

Operations 1010 to 1030 of FIG. 10A may be related to operation 630 of FIG. 6.

Referring to FIG. 10A, in operation 1010, the processor 120 may operate in a first mode. For example, operation 1010 may correspond to operation 630 of FIG. 6. For example, the processor 120 may receive signals from external electronic devices located within a designated angular range from the electronic device 400 based on identifying that the electronic device 400 is in the landscape mode. The processor 120 may identify or detect a location of each of the external electronic devices based on the received signals.

In operation 1020, the processor 120 of the electronic device 400 operating in the first mode may select at least one external electronic device located within a field of view (FOV) of a camera module based on the respective locations of the external electronic devices.

For example, referring to FIG. 10B, the processor 120 operating in the first mode may identify the external electronic devices 1001 (i.e., 1001*a*, 1001*b*, 1001*c*, 1001*d*, and 1001*e*) located within the FOV 1021 of the camera module 180, based on each of the locations of the external electronic devices 1001 determined in operation 1010.

In operation 1030, the processor 120 may transmit image data acquired using the camera module 180 to the external electronic devices located within the FOV of the camera module 180. For example, the processor 120 may acquire image data using the camera module 180. The processor 120 may establish a wireless connection with the external electronic devices 1001 identified as being within the FOV 1021 of the camera module 180 in operation 1020 using the RF circuit 192. The processor 120 may transmit the image data acquired by the camera module 180 to the external electronic devices 1001 through the established wireless connection. Unlike the above description, the electronic device 400 may include another communication circuit that is distinct from the RF circuit 192. The processor 120 may detect the locations of external electronic devices through the RF circuit 192 and may establish a wireless connection with the external electronic devices through another communication circuit that is distinct from the RF circuit 192. The wireless connection may include a wireless connection using Bluetooth or Wi-Fi, but is not limited thereto. The processor 120 may transmit image data acquired by the camera module 180 to the external electronic devices 1001 through another communication circuit.

Figure 11A:
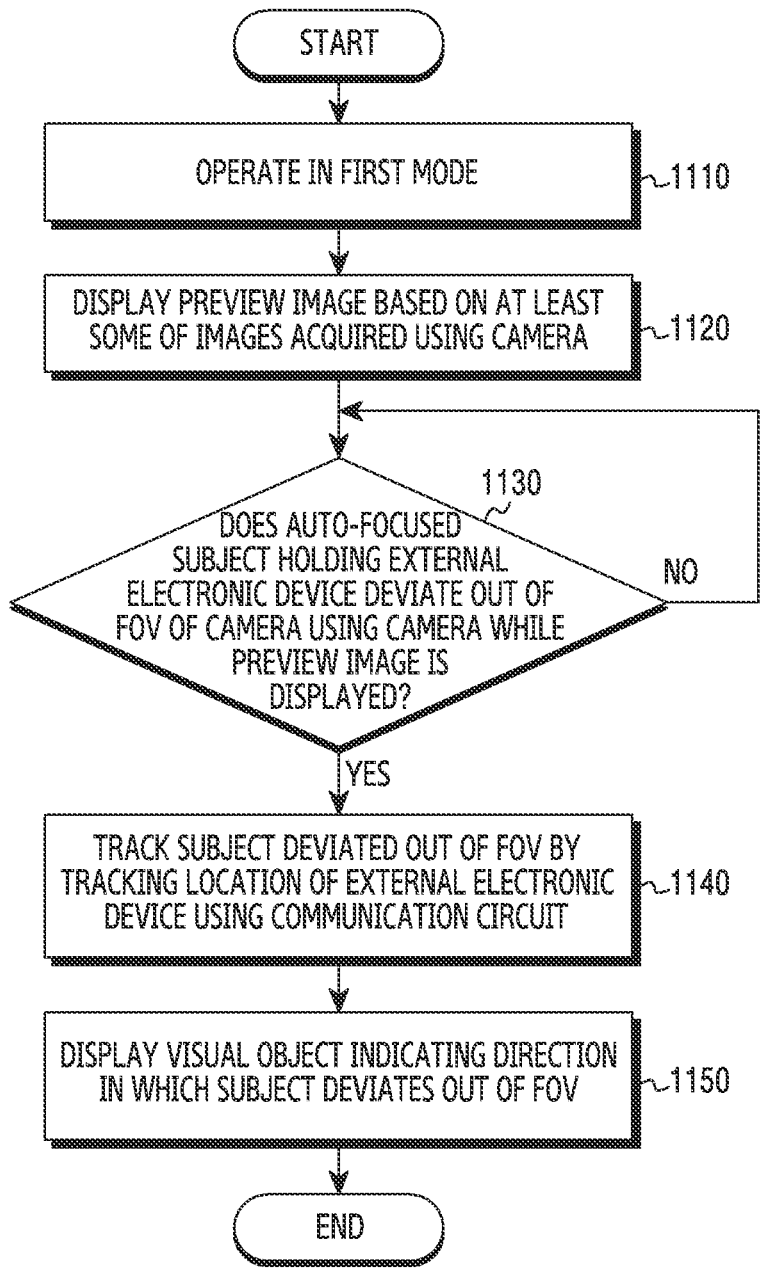
FIG. 11A is a flowchart illustrating a method of providing a location-based service based on a first mode according to an embodiment of the disclosure.

FIG. 11A is a flowchart illustrating a method of providing a location-based service based on a first mode according to an embodiment of the disclosure.

Figure 11B:
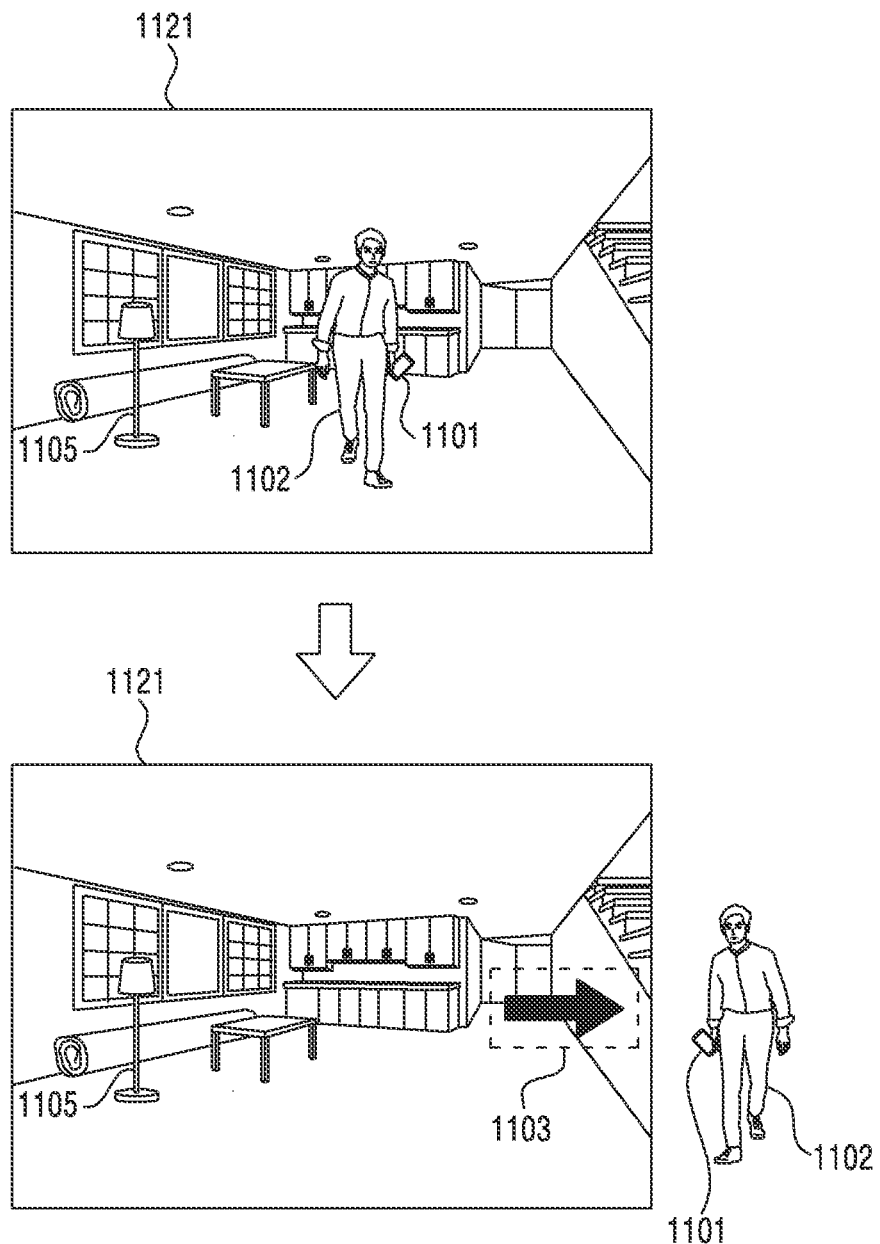
FIG. 11B is a diagram illustrating a location-based service provided based on a first mode according to an embodiment of the disclosure.

FIG. 11B is a diagram illustrating a location-based service provided based on a first mode according to an embodiment of the disclosure.

Operations 1110 to 1050 of FIG. 11A may be related to operation 630 of FIG. 6.

Referring to FIG. 11A, in operation 1110, the processor 120 may operate in a first mode. For example, operation 1110 may correspond to operation 630 of FIG. 6. For example, the processor 120 may receive signals from external electronic devices located within a designated angular range from the electronic device 400 based on identifying that the electronic device 400 is in the landscape mode. The processor 120 may identify or detect a location of each of the external electronic devices based on the received signals.

In operation 1120, the processor 120 of the electronic device 400 operating in the first mode may display a preview image on the display 160 based on at least some of images acquired using the camera module 180.

For example, referring to FIG. 11B, the processor 120 operating in the first mode may display a preview image 1121 on the display 160 based on at least some of images acquired using the camera module 180. An area displaying the preview image 1121 may correspond to a FOV of the camera module 180. According to embodiments, the area displaying the preview image 1121 may be smaller than an area covered by the FOV of the camera module 180. In the following descriptions, the preview image or the FOV of the camera module 180 has been mixed and described, but this is for convenience of description.

In operation 1130, while the preview image is displayed on the display 160, the processor 120 may identify whether an auto-focused subject holding the external electronic device is out of the FOV of the camera. For example, referring to FIG. 11B, the processor 120 may identify that the external electronic device 1101 is located in the preview image 1121 based on the locations of the external electronic devices determined in operation 1110. The processor 120 may identify that the auto-focused subject 1102 holding the external electronic device 1101 is located in the preview image 1121 using the camera module 180. The processor 120 may identify whether the auto-focused subject 1102 is out of the FOV 1021 of the camera module 180 by using the camera module 180. When the subject 1102 deviates out of the FOV 1021, the processor 120 may perform operation 1140, otherwise, the processor 120 may repeat operation 1130.

In operation 1140, based on identifying that the auto-focused subject 1102 deviates out of the FOV 1021 of the camera module 180, the processor 120 may track the subject that deviates out of the FOV. For example, referring to FIG. 11B, the processor 120 may track the location of the external electronic device 1102 based on the first mode, thereby tracking the location of the auto-focused subject 1102 holding the external electronic device 1102. The processor 120 may identify that the external electronic device 1105 that is distinguished from the external electronic device 1101 held by the subject 1102 is also located in the FOV 1021. When a change in the location of the external electronic device 1105 is not detected, the processor 120 may delay or ignore processing of the signal received from the external electronic device 1105.

In operation 1150, the processor 120 may display a visual object indicating a direction from which the subject deviates. For example, referring to FIG. 11B, the processor 120 may determine the direction from which the subject 1102 departs based on the location of the external electronic device 1101 tracked in operation 1140. The processor 120 may display the visual object 1103 that indicates or guides the determined deviated direction on an area on the display 160. The visual object 1103 may be displayed to be superimposed with a preview image 1121 of the camera.

Figure 12A:
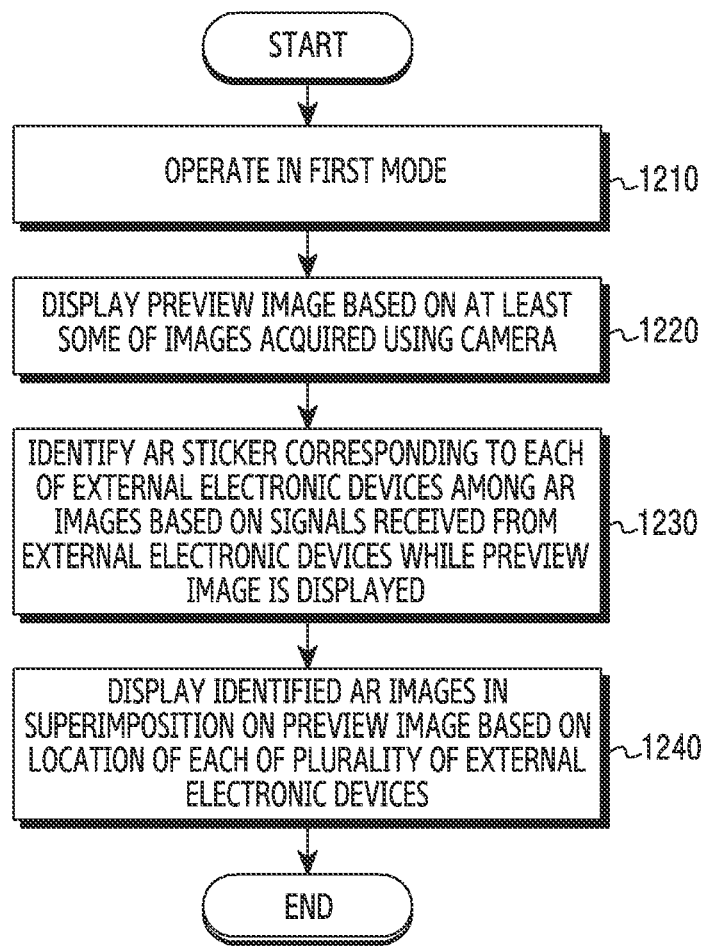
FIG. 12A is a flowchart illustrating a method of providing a location-based service based on a first mode according to an embodiment of the disclosure.

FIG. 12A is a flowchart illustrating a method of providing a location-based service based on a first mode according to an embodiment of the disclosure.

Figure 12B:
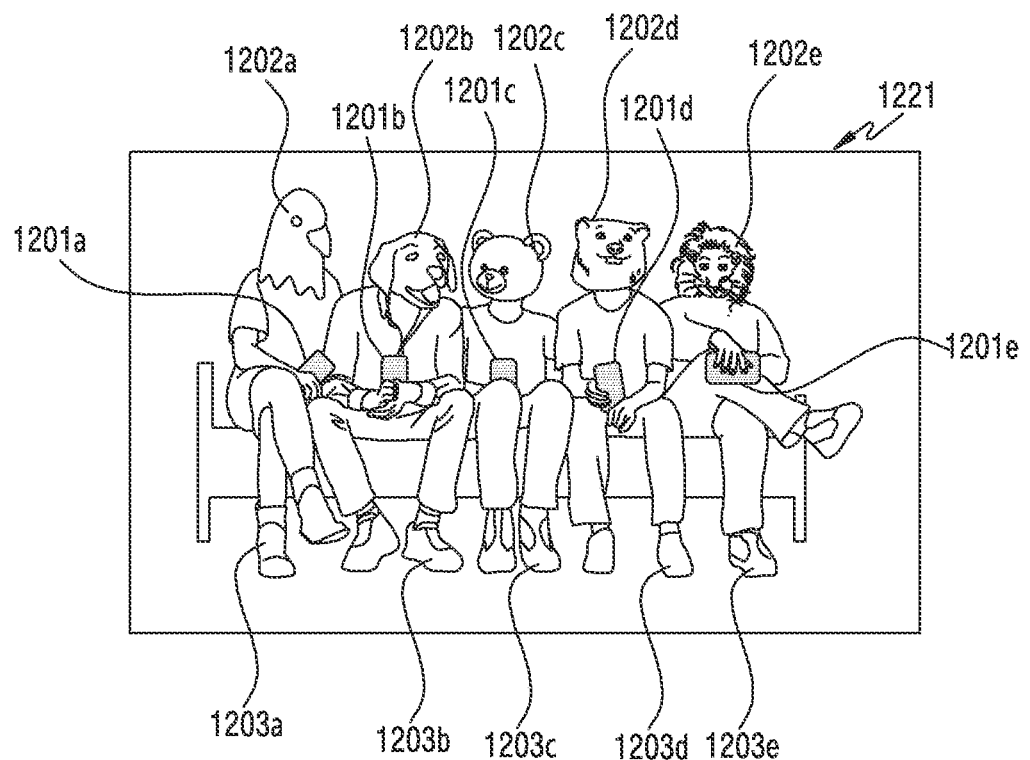
FIG. 12B is a diagram illustrating a location-based service provided based on a first mode according to an embodiment of the disclosure.

FIG. 12B is a diagram illustrating a location-based service provided based on a first mode according to an embodiment of the disclosure.

Operations 1210 to 1240 of FIG. 12A may be related to operation 630 of FIG. 6.

Referring to FIG. 12A, in operation 1210, the processor 120 may operate in a first mode. For example, operation 1210 may correspond to operation 630 of FIG. 6. For example, the processor 120 may receive signals from external electronic devices located within a designated angular range from the electronic device 400 based on identifying that the electronic device 400 is in the landscape mode. The processor 120 may identify or detect a location of each of the external electronic devices based on the received signals.

In operation 1220, the processor 120 may display a preview image based on at least some of images acquired using a camera.

Referring to FIG. 12B, the processor 120 may display a preview image 1221 on the display 160 based on at least some of images acquired using the camera module 180. For example, operation 1220 may correspond to operation 1120 of FIG. 11A.

In operation 1230, the processor 120 may identify an augmented reality (AR) image corresponding to each of the external electronic devices among AR images supportable by the electronic device 400 based on signals received from the external electronic devices located within the FOV while the preview image is displayed. For example, referring to FIG. 12B, the processor 120 may identify an AR image 1202 (i.e., 1202a, 1202b, 1202c, 1202d, and 1202e) corresponding to each of the external electronic devices 1201 (i.e., 1201a, 1201b, 1201c, 1201d, and 1201e) among the AR images supportable by the electronic device 400, based on the signals transmitted from the external electronic devices 1201 while the preview image 1221 is displayed. For example, the processor 120 may identify that the external electronic devices 1201 are located in the preview image 1221 based on the first mode. The signals received from each of the external electronic devices 1201 may include information on an ID of each of the external electronic devices 1201. The processor 120 may identify the AR image 1202 corresponding to each of the external electronic devices 1201 based on the information on the ID of each of the external electronic devices 1201 among the AR images stored in an external server of the electronic device 400 or the memory 130 of the electronic device 400. For example, the processor 120 may identify the AR image based on information indicating the ID of each of the external electronic devices 1201 and data on the AR image corresponding to each ID. Data for each of the visual objects corresponding to the respective IDs may be at least one of data stored in the memory of the electronic device 400, data provided from an external server, and data provided along with the signals received from the external electronic devices.

Before performing operation 1230, the processor 120 may perform an operation of (e.g., operation 1020 of FIG. 10A) of identifying at least one external electronic device located within the FOV of the camera module based on the location of each of the external electronic devices.

In operation 1240, the processor 120 may display the AR image 1202 identified in operation 1230 in superimposition on the preview image 1221. For example, the processor 120 may identify subjects 1203 (i.e., 1203a, 1203b, 1203c, 1203d, and 1203e) corresponding to the respective external electronic devices 1201 based on the location of each of the external electronic devices 1201 determined in operation 1230 and data on each of the subjects 1203 acquired through the camera module 180. The processor 120 may display the images 1202 identified in operation 1230 to be at least partially superimposed with each of the subjects 1203 corresponding to each of the external electronic devices 1201. For example, the processor 120 may recognize the face of the subject using a face recognition function, and may display the AR image 1202*a* corresponding to the external electronic device 1201*a* in superimposition on the preview image 1221 corresponding to the face of the subject 1203*a*. Unlike the above, the shape of the AR image and/or an area on the preview image 1221 in which the AR image is displayed to be superimposed may be different. For example, unlike shown in the drawings, the AR image may vary according to data on the AR image corresponding to the ID of the external electronic device. For example, unlike shown in the drawings, the AR image may be displayed in superimposition on at least a partial area of the area on the preview image 1221 rather than the area corresponding to the subject's face or on the area on the preview image 1221 corresponding to the location of the external electronic device.

According to various embodiments, the camera module 180 may include a time of flight (TOF) camera. The TOF camera may include a lens, an image processor, a light emitting unit, and a light receiving unit. The TOF camera may generate image data by using an image processor for an image captured through the lens. The TOF camera may measure a distance between each of the subjects 1203 and the electronic device 400 using the light emitting unit and the light receiving unit synchronized with the light emitting unit. For example, the light emitting unit may emit light while blinking at a predetermined period, and the light receiving unit may receive light emitted from the light emitting unit and reflected on the subject. Since the light emitting unit and the light receiving unit are visually synchronized, the TOF camera may measure the time at which light emitted from the light emitting unit is reflected and received by the light receiving unit. The processor 120 or the image processor of the TOF camera may calculate the distance between each of the subjects 1203 and the electronic device 400 based on the measured time.

According to various embodiments, the processor 120 may determine a location where each of the AR images 1202 is in superimposition on the preview image 1221, based on the distance between each of the subjects 1203 acquired using the TOF camera and the electronic device 400 and information about a location of each of the external electronic devices 1201 determined in operation 1230. For example, the processor 120 may compensate the distance information acquired using the TOF camera based on information about each distance of the external electronic devices 1201 obtained through the first mode. The processor 120 may determine the location where the AR images 1202 are to be at least partially superimposed with the subjects 1203 on the preview image 1221, based on the compensated distance information.

Figure 13A:
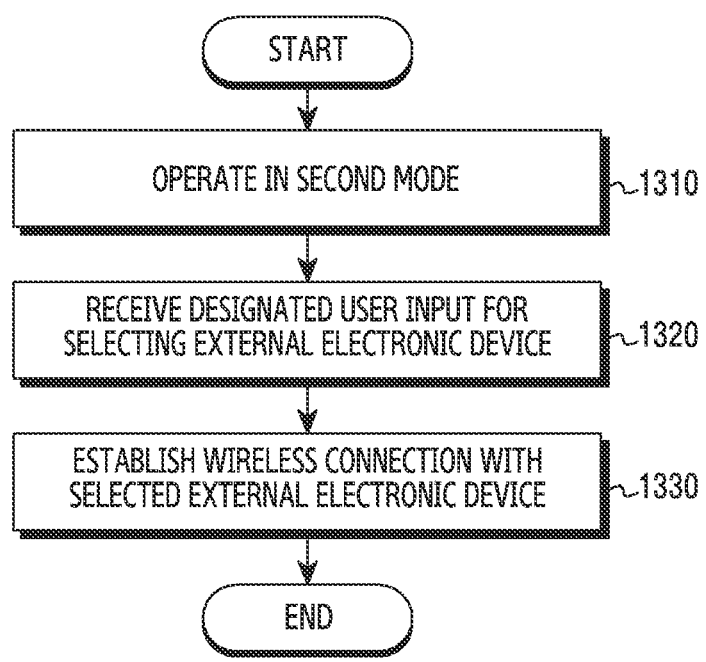
FIG. 13A is a flowchart illustrating a method of providing a location-based service based on a second mode according to an embodiment of the disclosure.

FIG. 13A is a flowchart illustrating a method of providing a location-based service based on a second mode according to an embodiment of the disclosure.

FIGS. 13B, 13C, 13D, and 13E are diagrams illustrating a location-based service provided based on a second mode according to various embodiments of the disclosure.

Operations of FIG. 13A may be performed by executing at least one program (or application) stored in the memory of the electronic device 400. The at least one program may include instructions enabling the processor 120 of the electronic device 400 to perform operations or steps to be described later.

Operations 1310 to 1330 of FIG. 13A may be related to operation 640 of FIG. 6.

Referring to FIG. 13A, in operation 1310, the processor 120 of the electronic device 400 may operate in the second mode.

According to an embodiment, operation 1210 may correspond to operation 640 of FIG. 6. For example, based on identifying that the electronic device 400 is not in the landscape mode, the processor 120 may receive signals from external electronic devices positioned in a designated angular range (e.g., the coverage of the second mode) from the electronic device 400. The processor 120 may identify or detect the locations of the external electronic devices based on the received signals.

In another embodiment, in operation 1210, even if the electronic device 400 is not in the landscape mode, when the at least one program is executed, the processor 120 may operate in the second mode.

In another embodiment, in operation 1210, when the at least one program is executed, the processor 120 may operate in the second mode when it is identified that the electronic device 400 is not in the landscape mode. When it is identified that the electronic device 400 is in the landscape mode, the processor 120 may display a user interface indicating a guide for allowing the user to enter the electronic device 400 into the portrait mode, on the display 160.

In operation 1320, the processor 120 operating in the second mode may receive a designated user input for selecting an external electronic device.

Figure 13B:
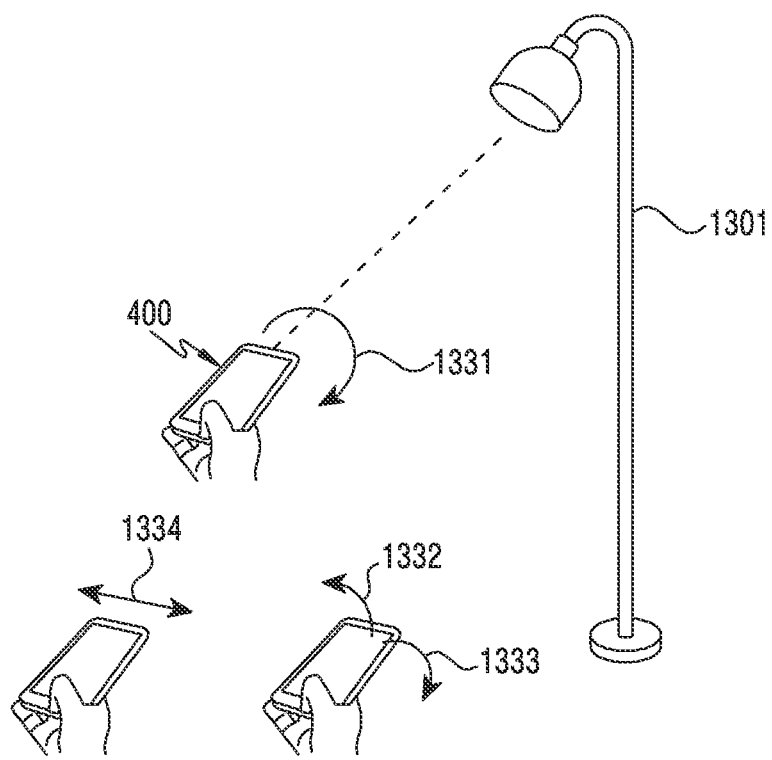
FIG. 13B is a diagram illustrating a location-based service provided based on a second mode according to an embodiment of the disclosure.

According to various embodiments, referring to FIG. 13B, the designated user input may be a gesture for directing a designated portion of the electronic device 400 toward the external electronic device 1301 so that the external electronic device 1301 is located within the coverage of the second mode. For example, the designated user input may be a gesture in which the first edge 401*a* of the housing 401 faces the external electronic device 1301 located within the coverage of the second mode. According to various embodiments, the designated user input may identify that the external electronic device 1301 is positioned in a direction determined based on the arrangement of the first antenna 410 and second antenna 420 of the electronic device 400 for a designated time, through the RF circuit 192. For example, the designated user input may be a gesture of holding the electronic device 400 by the user of the electronic device 400 so that the external electronic device 1301 is located within the coverage (e.g., an area corresponding to the dotted line a of FIG. 8) of the second mode for a designated time.

According to various embodiments, the designated user input is to identify that the posture of the electronic device 400 is changed using the sensor module 176 while the external electronic device 1301 is positioned in a direction determined based on the arrangement of the first antenna 410 and second antenna 420 of the electronic device 400. For example, referring to FIG. 13B, the designated user input may be a gesture 1331 of drawing a circle using the electronic device 400, a gesture 1332 of raising the electronic device 400, a gesture 1333 of lowering the electronic device 400, or a gesture 1334 of shaking the electronic device 400 from side to side, while the external electronic device 1301 is located within the coverage of the second mode by the user of the electronic device 400. According to various embodiments, the designated user input is not limited to the example illustrated in FIG. 13B, and the user of the electronic device 400 may select or generate a designated user input for selecting the external electronic device 1301.

In operation 1320, the processor 120 may further perform an operation of displaying a user interface guiding a designated user input on the display area of the display 160. For example, when the designated user input is the gesture of raising the electronic device 400 among the above-described examples, the processor 120 may display a user interface for indicating the gesture of raising the electronic device 400 on the display 160 in order to receive the designated user input.

In operation 1330, the processor 120 may establish a wireless connection with the external electronic device 1301 selected in operation 1320.

Figure 13C:
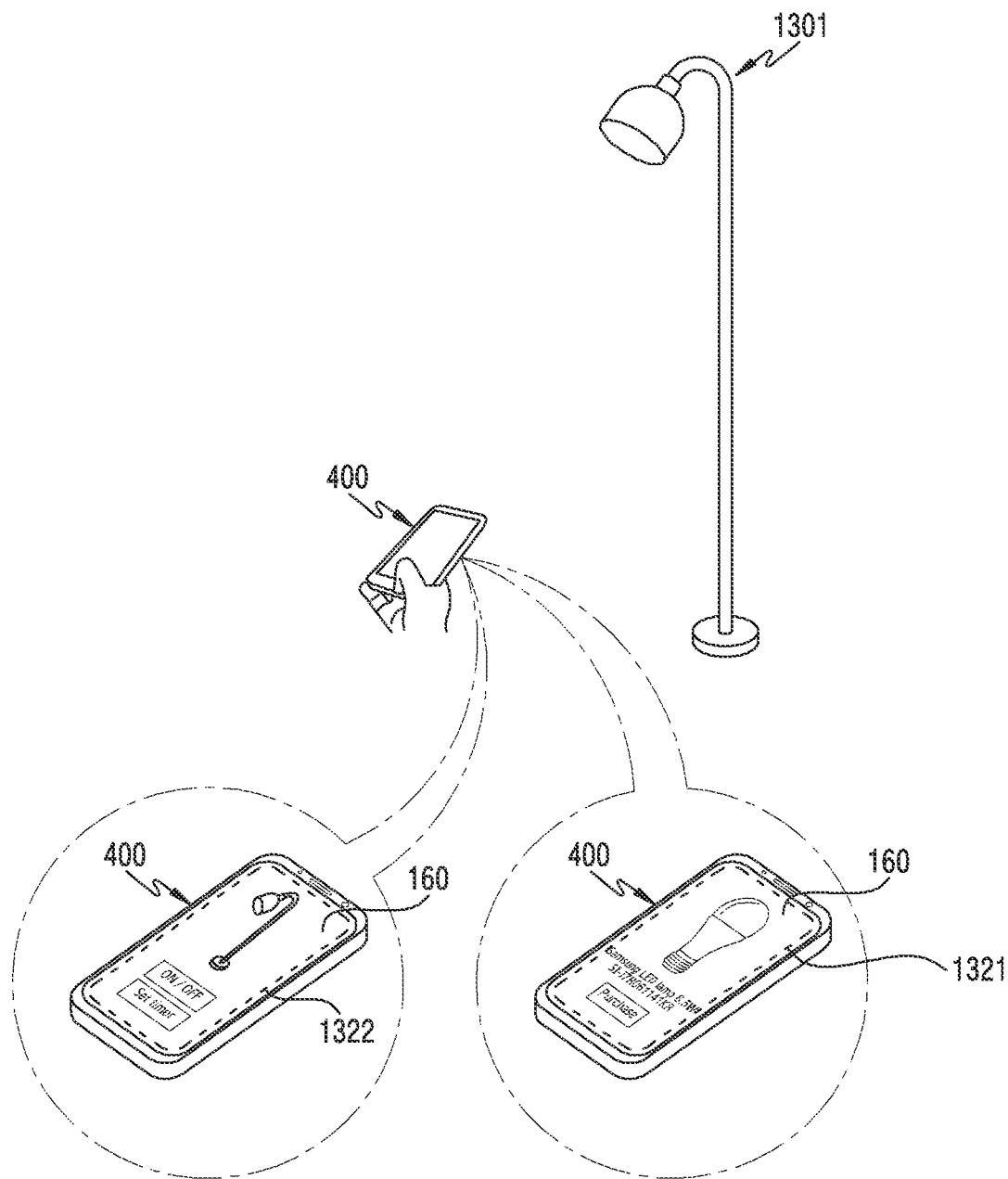
FIG. 13C is a diagram illustrating a location-based service provided based on a second mode according to an embodiment of the disclosure.

For example, referring to FIG. 13C, the processor 120 may establish a wireless connection with the selected external electronic device 1301 using the RF circuit 192. The processor 120 may transmit and receive signals, data, or instructions to and from the external electronic device 1301 with which the wireless connection has been established. Unlike the above description, the electronic device 400 may include another communication circuit that is distinct from the RF circuit 192. The processor 120 may provide a location-based service through the RF circuit 192 and may establish a wireless connection with the external electronic device through another communication circuit that is distinct from the RF circuit 192.

According to various embodiments, the processor 120 may control the external electronic device 1301 with which the wireless connection has been established. For example, the processor 120 may display a user interface (UI) 1322 for controlling the external electronic device 1301 with a wireless connection established on the display 160. The user of the electronic device 400 may control the operating state of the external electronic device 1301 through the UI 1322.

According to various embodiments, the processor 120 may receive information on the external electronic device 1301 with which the wireless connection has been established. For example, the processor 120 may receive the information on the external electronic device 1301 with which the wireless connection has been established, and may display a UI 1321 indicating the information on the display 160. The user of the electronic device 400 may check the information on the external electronic device 1301 through the UI 1321 or may perform an operation necessary for maintenance and management of the external electronic device 1301 based on the information. For example, the processor 120 may display the UI 1321 including an object for purchasing consumables of the external electronic device 1301, and the user of the electronic device 400 may access a website where the purchase of the consumable is possible or execute a related application.

Figure 13D:
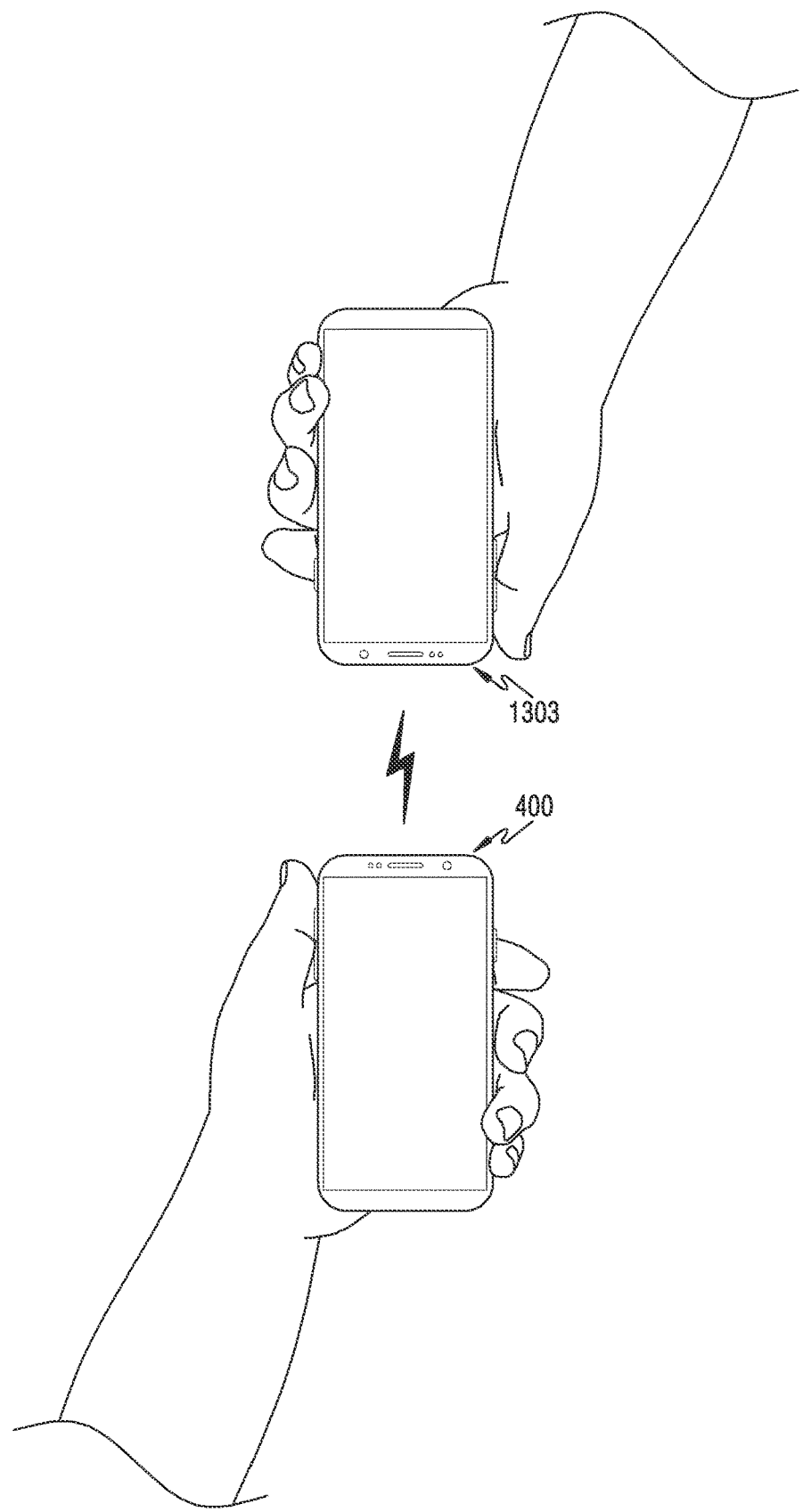
FIG. 13D is a diagram illustrating a location-based service provided based on a second mode according to an embodiment of the disclosure.

According to various embodiments, referring to FIG. 13D, the processor 120 operating in the second mode may transmit/receive data to/from the external electronic device 1303 with which the wireless connection has been established.

Figure 13E:
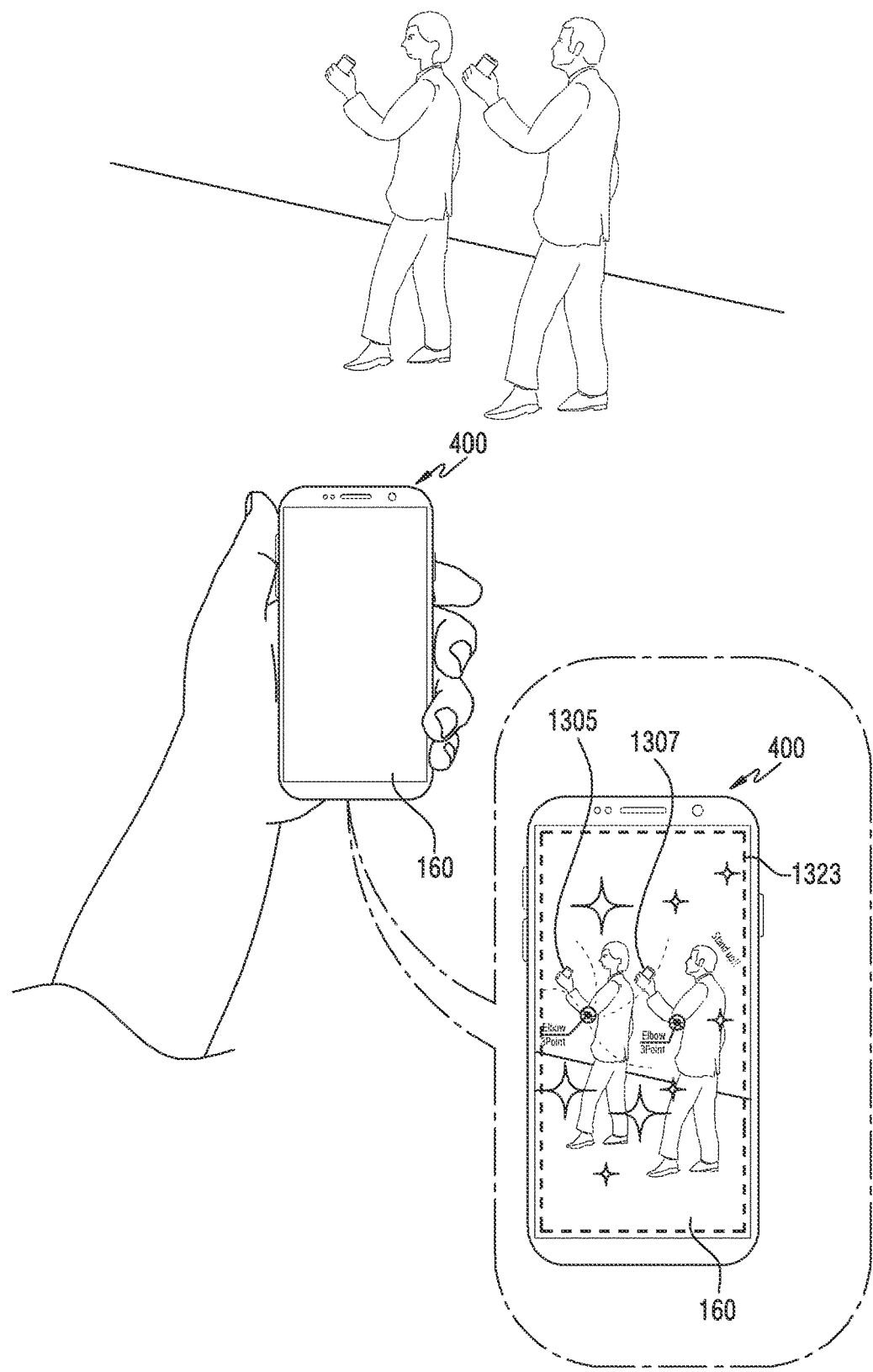
FIG. 13E is a diagram illustrating a location-based service provided based on a second mode according to an embodiment of the disclosure.

According to various embodiments, referring to FIG. 13E, the processor 120 operating in the second mode may determine the location of each of the external electronic devices 1305 and 1307 based on signals transmitted from the external electronic devices 1305 and 1307 with which the wireless connection has been established. The processor 120 may determine whether each of the external electronic devices 1305 and 1307 is located within the FOV of the camera module 180, based on the location of each of the external electronic devices 1305 and 1307. The processor 120 may execute an application of providing an AR service. For example, the processor 120 may execute a game in which an AR service is provided, and may display a preview image 1323 obtained by the camera module 180 on the display 160. The preview image 1323 may correspond to the FOV of the camera module 180. The processor 120 may display an AR graphic user interface (GUI) on the display 160 in superimposition with the preview image 1323 based on the respective locations of the external electronic devices 1305 and 1307 with which the wireless connection has been established.

Figure 14A:
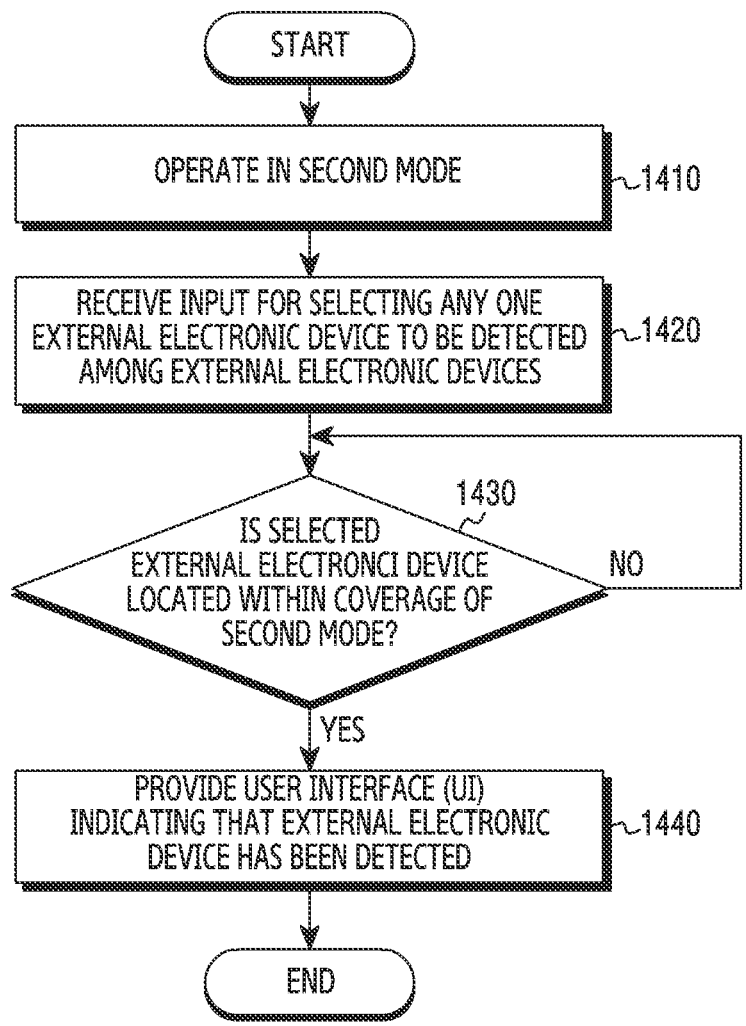
FIG. 14A is a flowchart illustrating a method of providing a location-based service based on a second mode according to an embodiment of the disclosure.

FIG. 14A is a flowchart illustrating a method of providing a location-based service based on a second mode according to an embodiment of the disclosure.

Figure 14B:
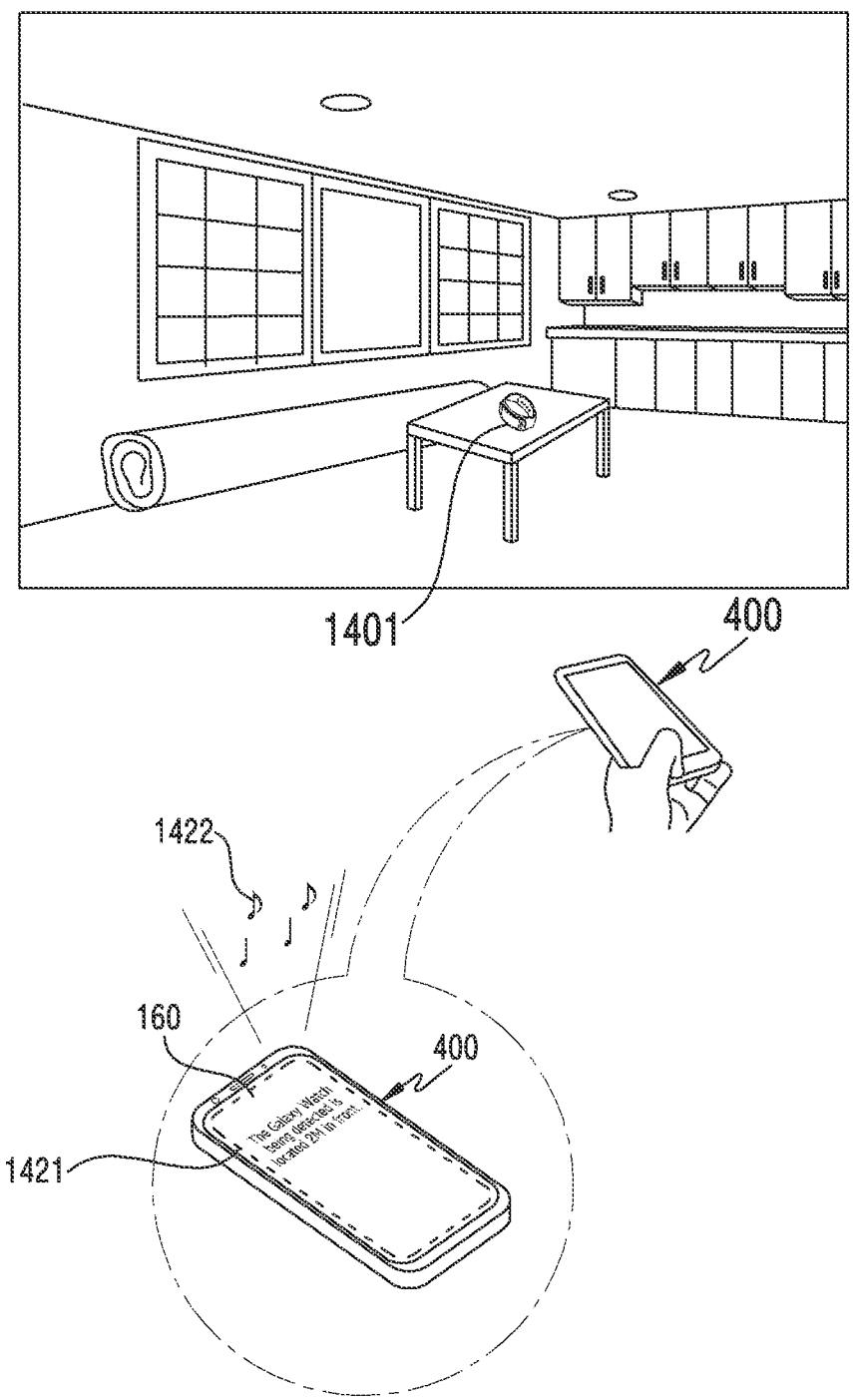
FIG. 14B is a diagram illustrating a location-based service provided based on a second mode according to an embodiment of the disclosure.

FIG. 14B is a diagram illustrating a location-based service provided based on a second mode according to an embodiment of the disclosure.

Operations 1410 to 1440 of FIG. 14A may be related to operation 640 of FIG. 6.

Referring to FIG. 14A, in operation 1410, the processor 120 may operate in the second mode. For example, operation 1210 may correspond to operation 640 of FIG. 6. For example, based on identifying that the electronic device 400 is not in the landscape mode, the processor 120 may receive signals from external electronic devices located within a designated angular range (e.g., the coverage of the second mode) from the electronic device 400. The processor 120 may identify or detect the locations of the external electronic devices based on the received signals.

In operation 1420, the processor 120 may receive an input for selecting any one external electronic device to be detected from among the external electronic devices. The processor 120 may display a list of the external electronic devices on the display 160 based on history data of the first mode and the second mode. The user of the electronic device 400 may select an electronic device to be detected from the list of the external electronic devices. Even if the electronic device to be detected does not exist in the list of the external electronic devices, the user of the electronic device 400 may add and select the electronic device to be detected.

In operation 1430, the processor 120 may identify whether the external electronic device selected in operation 1420 is located within the coverage of the second mode. The user may search for the location of the external electronic device to be detected through the electronic device 400 operating in the second mode. According to various embodiments, when the processor 120 identifies that the selected external electronic device is located within the coverage of the second mode, operation 1440 may be performed, otherwise operation 1430 may be repeatedly performed.

In operation 1440, the processor 120 may provide a UI indicating that the external electronic device has been detected to the user of the electronic device 400 based on identifying that the external electronic device is located within the coverage of the second mode.

For example, referring to FIG. 14B, when the external electronic device 1401 is located within the second mode coverage of the electronic device 400, the processor 120 may display a UI 1421 including information on the detected external electronic device 1401 on the display 160. The UI 1421 may include text or a visual object indicating the location of the external electronic device. According to various embodiments, when the external electronic device 1401 is located within the coverage of the second mode of the electronic device 400, the processor 120 may output an audio user interface (AUI) 1422 informing that the external electronic device 1401 has been detected. The AUI 1422 may include voice guidance, music, or various ringtones.

Figure 15A:
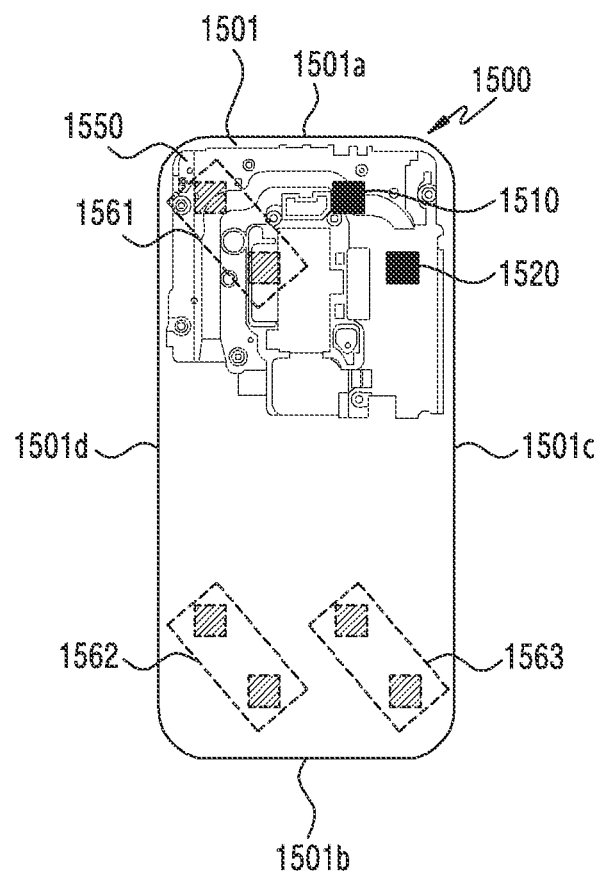
FIG. 15A illustrates an electronic device including a plurality of antennas according to an embodiment of the disclosure.

FIG. 15A illustrates an electronic device including a plurality of antennas according to an embodiment of the disclosure.

Referring to FIG. 15A, an electronic device 1500 (e.g., the electronic device 101 of FIG. 2A) may include a housing 1501, a first antenna 1510 (e.g., the first antenna 210 of FIG. 2A), and a second antenna 1520 (e.g., the second antenna 220 of FIG. 2A).

According to various embodiments, the housing 1501 may form front and rear surfaces of the electronic device 400 and side surfaces surrounding the front and rear surfaces thereof.

According to various embodiments, the side surface of the electronic device 1500 may form, define, or include a first edge 1501a, a second edge 1501b substantially parallel to the first edge 1501a, a third edge 1501c extending from one end of the first edge 1501a to one end of the second edge 1501b and longer than the first edge 1501a, and a fourth edge 1501d extending from the other end of the first edge 1501a to the other end of the second edge 1501b.

According to various embodiments, the first antenna 1510 may be spaced apart from the first edge 1501a and the third edge 1501c, respectively, and may be disposed inside the housing 1501. The first antenna 1510 may be disposed closer to the first edge 1501a than to the second edge 1501b. The first antenna 1510 may be disposed closer to the third edge 1501c than to the fourth edge 1501d.

According to various embodiments, the second antenna 1520 may be spaced apart from the first antenna 1510 and the third edge 1501c, respectively, and may be disposed inside the housing 1501. The second antenna 1520 may be disposed closer to the first edge 1501a than to the second edge 1501b. The second antenna 1520 may be disposed closer to the third edge 1501c than to the fourth edge 1501d.

According to various embodiments, the first antenna 1510 and the second antenna 1520 may be spaced apart from each other by a designated distance from the third edge 1501c. The spaced distance between the first antenna 1510 and the third edge 1501c may be different from the spaced distance between the second antenna 1520 and the third edge 1501c. A straight line passing through the first antenna 1510 and the second antenna 1520 may pass through the first edge 1501a and the third edge 1501c. The straight line may be a straight line passing through the center of the feeding portion of the first antenna 1510 and the second antenna 1520 or the center of the radiating portion thereof.

According to various embodiments, the first antenna 1510 and the second antenna 1520 may be spaced apart from each other by a designated distance. For example, the first antenna 1510 and the second antenna 1520 may be spaced apart by a distance corresponding to half the wavelength of a signal transmitted and received through the antenna module.

According to various embodiments, the electronic device 1500 may further include a bracket 1550. The bracket 1550 may be disposed inside the housing 1501 to support other components of the electronic device 1500. In an embodiment, when the first antenna 1510 and the second antenna 1520 are provided as a patch antenna, the first antenna 1510 and the second antenna 1520 may be disposed on the bracket 1550. In another embodiment, the first antenna 1510 and the second antenna 1520 may be provided as different types of antennas other than the patch antenna. However, even in this case, relative positions between the first antenna 1510, the second antenna 1520, and the housing 1501 may be substantially the same.

In various embodiments, the description of the positions of the first antenna 1510 and the second antenna 1520 shown in FIG. 15A may be provided to describe the arrangement of the first antenna 1510 and the second antenna 1520 inside the electronic device 1500. For example, the first antenna 1510 and the second antenna 1520 may be disposed in different positions (e.g., areas 1561, 1562, and 1563) of the housing 1501 in the same arrangement as shown in FIG. 15A.

Figure 15B:
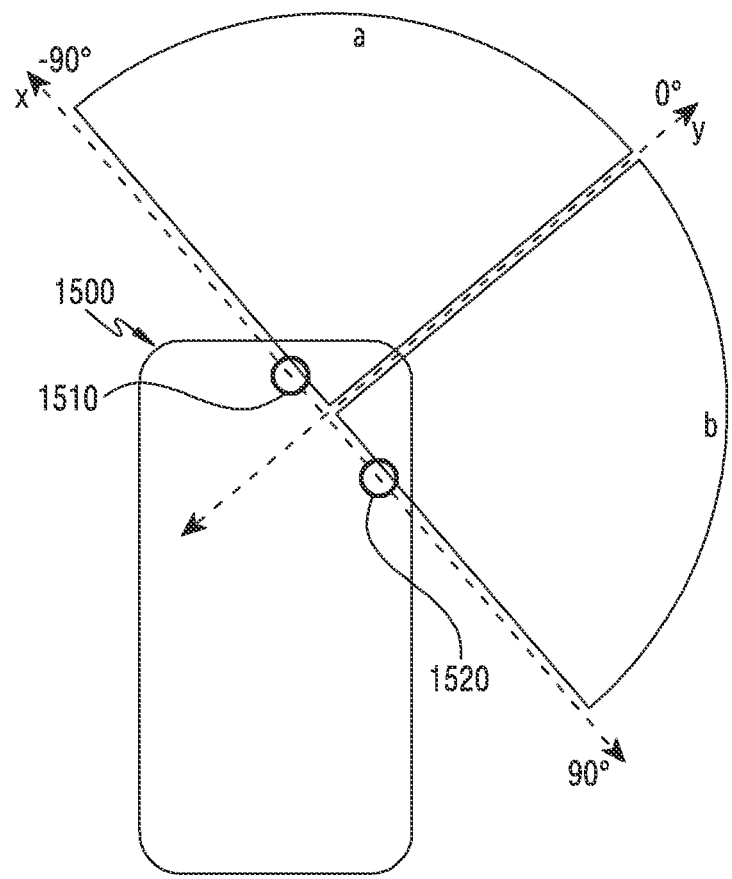
FIG. 15B illustrates a detection area of an electronic device in a portrait mode according to an embodiment of the disclosure.

FIG. 15B illustrates a detection area of an electronic device in a portrait mode according to an embodiment of the disclosure.

Figure 15C:
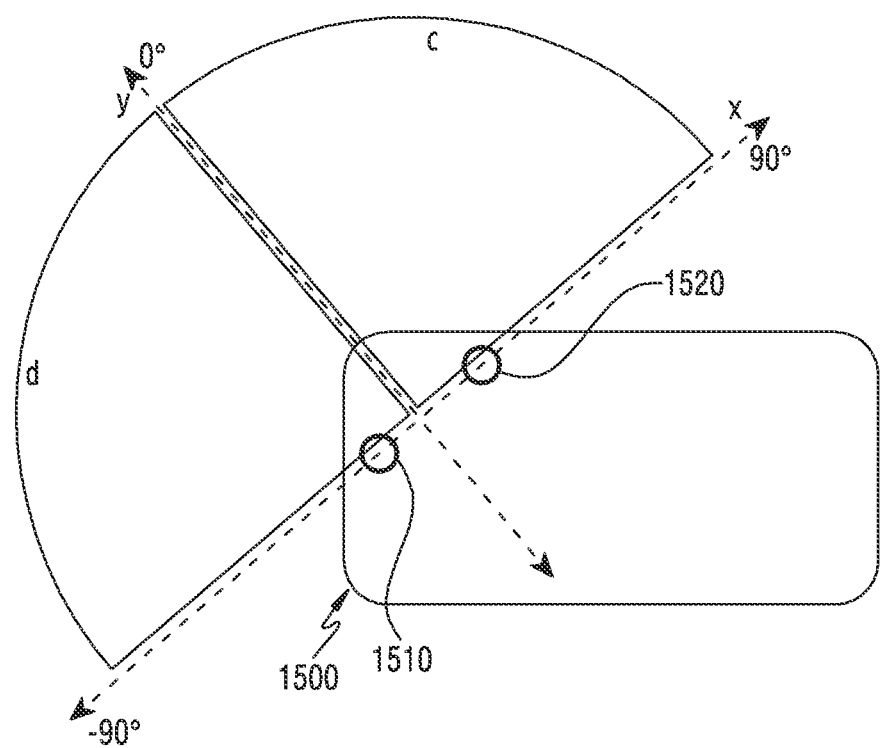
FIG. 15C illustrates a detection area of an electronic device in a landscape mode according to an embodiment of the disclosure.

FIG. 15C illustrates a detection area of an electronic device in a landscape mode according to an embodiment of the disclosure.

Figure 15D:
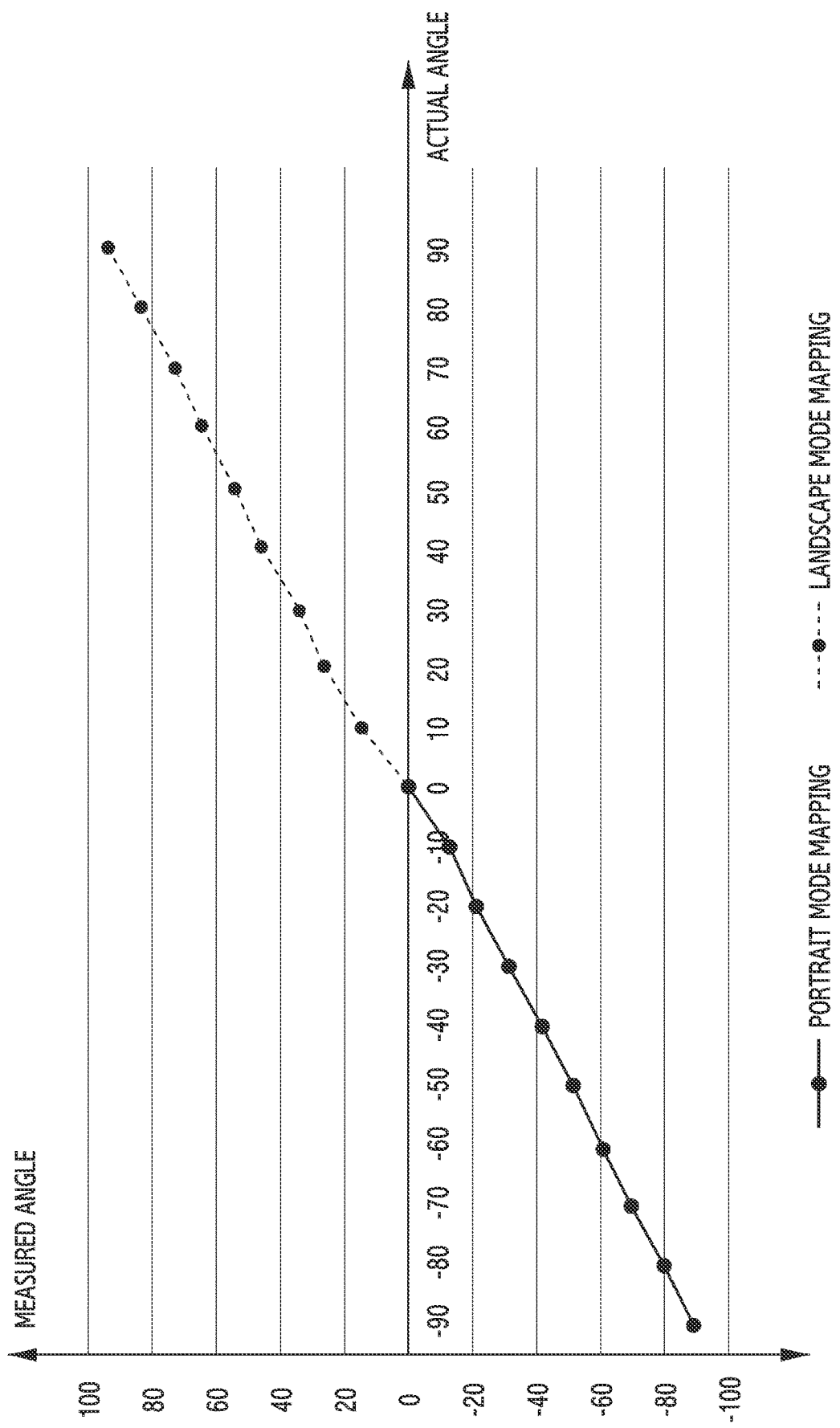
FIG. 15D is a graph illustrating a detection angle and an actual angle of an electronic device according to a portrait mode and a landscape mode according to an embodiment of the disclosure.

FIG. 15D is a graph illustrating a detection angle and an actual angle of an electronic device according to a portrait mode and a landscape mode according to an embodiment of the disclosure.

Referring to FIG. 15B, the electronic device 1500 may provide a location-based service using the first antenna 1510 and the second antenna 1520. According to various embodiments, the processor 120 (e.g., the processor 120 of FIG. 2A) of the electronic device 1500 may use the sensor module 176 (e.g., the sensor module 176 of FIG. 2A) to detect the posture of the electronic device 1500. The processor 120 may operate in the portrait mode based on the detected posture of the electronic device 1500.

According to various embodiments, the processor 120 operating in the portrait mode may receive UWB signals provided from external electronic devices located in areas a and b. The UWB signal may be received through the first antenna 1510 and the second antenna 1520 of the electronic device 1500, and the received UWB signal may be demodulated through the RF circuit 192 (e.g., the RF circuit 192 of FIG. 2A). The demodulated UWB signal may be interpreted or processed by the processor 120. The processor 120 may acquire or generate data on the phase, angle, and distance of the UWB signal based on the processed UWB signal. The processor 120 may calculate the location of the external electronic device that is a UWB signal source based on the acquired or generated data.

According to various embodiments, the processor 120 operating in the portrait mode may receive and processes only the signals transmitted from the external electronic devices located in the area a corresponding to −90° to 0° with respect to the y-axis, and may delay, ignore, or abandon the processing of the signals transmitted from the external electronic devices positioned in the area b corresponding to 0° to +90° with respect to the y-axis.

Referring to FIG. 15C, the processor 120 of the electronic device 1500 may detect the posture of the electronic device 1500 using the sensor module 176. The processor 120 may operate in the landscape mode based on the detected posture of the electronic device 1500.

According to various embodiments, the processor 120 operating in the landscape mode may receive the UWB signals provided from the external electronic devices located in an area c and an area d. The processor 120 may calculate the location of the external electronic device based on the received UWB signals.

According to various embodiments, the processor 120 operating in the landscape mode may receive and process only signals transmitted from the external electronic devices located in the area c corresponding to 0° to +90° with respect to the y-axis, and may delay, ignore, or abandon the processing of the signals transmitted from the external electronic devices positioned in the area d corresponding to −90° to 0° with respect to the y-axis.

Referring to FIG. 15D, in the portrait mode, the processor 120 may measure an angle formed by the electronic device 1500 and the external electronic device with respect to the y-axis only when an angle at which the external electronic device is actually located corresponds to the range of −90° to 0° (e.g., the area a of FIG. 15B). In the landscape mode, the processor 120 may measure the angle formed by the electronic device 1500 and the external electronic device with respect to the y-axis only when the angle at which the external electronic device is actually located corresponds to the range of −90° to 0° (e.g., the area c of FIG. 15C).

The description of the detectable area of the electronic device 1500 does not limit the detection range of the electronic device 1500. The detectable area in each of the portrait mode or the landscape mode may vary depending on the arrangement of the first antenna 1510 and the second antenna 1520, and an angular range for delaying processing of received signals may be configured and determined according to each mode. The electronic device 1500 may determine the coverage of the landscape mode or the portrait mode according to the determined angular range.

Figure 16A:
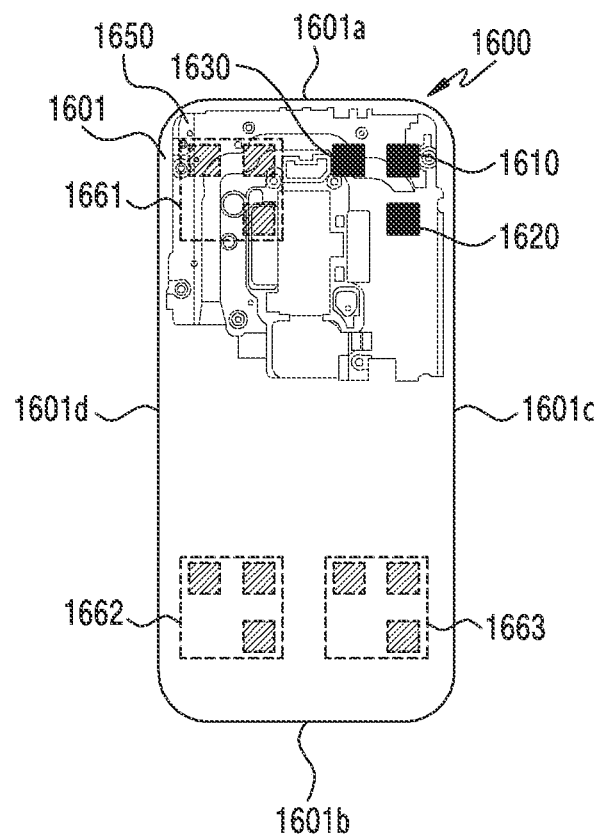
FIG. 16A is a diagram illustrating an electronic device including a plurality of antennas according to an embodiment of the disclosure.

FIG. 16A is a diagram illustrating an electronic device including a plurality of antennas according to an embodiment of the disclosure.

Referring to FIG. 16A, an electronic device 1600 (e.g., the electronic device 101 of FIG. 2A) may include a housing 1601, a first antenna 1610 (e.g., the first antenna 210 of FIG. 2A), a second antenna 1620 (e.g., the second antenna 220 of FIG. 2A), and a third antenna 1630.

According to various embodiments, the housing 1601 may form front and rear surfaces of the electronic device 1600 and side surfaces surrounding the front and rear surfaces thereof.

According to various embodiments, the side surface of the electronic device 1600 may form, define, or include a first edge 1601a, a second edge 1601b substantially parallel to the first edge 1601a, a third edge 1601c extending from one end of the first edge 1601a to one end of the second edge 1601b and longer than the first edge 1601a, and a fourth edge 1601d extending from the other end of the first edge 1601a to the other end of the second edge 1601b.

According to various embodiments, the first antenna 1610 may be spaced apart from the side surface of the housing 1601 and may be disposed inside the housing 1601. The first antenna 1610 may be disposed closer to the first edge 1601a than to the second edge 1601b. The first antenna 1610 may be disposed closer to the third edge 1601c than to the fourth edge 1601d.

According to various embodiments, the second antenna 1620 may be spaced apart from the side surface of the housing 1601 and the first antenna 1610, respectively, and may be disposed inside the housing 1601. The second antenna 1620 may be disposed closer to the first edge 1601a than to the second edge 1601b. The second antenna 1620 may be disposed closer to the third edge 1601c than to the fourth edge 1601d. The second antenna 1620 may be disposed between the first antenna 1610 and the second edge 1601b.

According to various embodiments, the third antenna 1630 may be disposed inside the housing 1601 while being spaced apart from the side surface of the housing 1601, the first antenna 1610, and the second antenna 1620, respectively. The third antenna 1630 may be disposed closer to the first edge 1601a than to the second edge 1601b. The third antenna 1630 may be disposed closer to the third edge 1601c than to the fourth edge 1601d. The third antenna 1630 may be disposed between the first antenna 1610 and the fourth edge 1601d.

According to various embodiments, the first antenna 1610 and the second antenna 1620 may be spaced apart from the third edge 1601c by a designated distance. The first antenna 1610 and the second antenna 1620 may be spaced apart from each other by a designed distance from the first edge 1601a. A distance between the first antenna 1610 and the first edge 1601a may be different from a distance between the second antenna 1620 and the first edge 1601a. A straight line passing through the first antenna 1610 and the second antenna 1620 may be substantially parallel to the third edge 1601c. The straight line passing through the first antenna 1610 and the second antenna 1620 may be a line segment passing through the center of the feeding portion or the center of the radiating portion of the first antenna 1610 and the second antenna 1620.

According to various embodiments, the first antenna 1610 and the third antenna 1630 may be spaced apart from the first edge 1601a by a first designated distance. The first antenna 1610 and the third antenna 1630 may be spaced apart from each other by a second designated distance from the second edge 1601b. The first designated distance may be less than the second designated distance. The first antenna 1610 and the third antenna 1630 may be disposed closer to the first edge 1601a than to the second edge 1601b. A distance between the first antenna 1610 and the third edge 1601c may be different from a distance between the third antenna 1630 and the third edge 1601c. A straight line passing through the first antenna 1610 and the third antenna 1630 may be substantially parallel to the first edge 1601a. The straight line passing through the first antenna 1610 and the third antenna 1630 may be a line segment passing through the center of a feeding portion or the center of a radiating portion of the first antenna 1610 and the third antenna 1630.

According to various embodiments, the second antenna 1620 and the third antenna 1630 may be spaced apart from each other by different distances from the third edge 1601c. A straight line passing through the second antenna 1620 and the third antenna 1630 may pass through the first edge 1601a and the third edge 1601c. The straight line passing through the second antenna 1620 and the third antenna 1630 may be a straight line passing through the center of the feeding portion or the center of the radiating portion of the second antenna 1620 and the third antenna 1630.

According to various embodiments, the electronic device 1600 may further include a bracket 1650. The bracket 1650 may be disposed inside the housing 1601 to support other components of the electronic device 1600. In an embodiment, when the first antenna 1610, the second antenna 1620, and the third antenna 1630 are provided as a patch antenna, the first antenna 1610, the second antenna 1620, and the third antenna 1630 may be disposed on the bracket 550. In another embodiment, the first antenna 1610, the second antenna 1620, and the third antenna 1630 may be provided as different types of antennas other than the patch antenna. However, even in this case, the relative positions between the first antenna 1610, the second antenna 1620, the third antenna 1630, and the housing 1601 may be substantially the same.

According to various embodiments, the description of the positions of the first antenna 1610, the second antenna 1620, and the third antenna 1630 illustrated in FIG. 16A may be provided to describe the arrangement of the first antenna 1610, the second antenna 1620, and the third antenna 1630 inside the electronic device 1600. For example, the first antenna 1610, the second antenna 1620, and the third antenna 1630 may be arranged in different areas 1661, 1662, or 1663 of the housing 1601 in the same arrangement as shown in FIG. 16A.

Figure 16B:
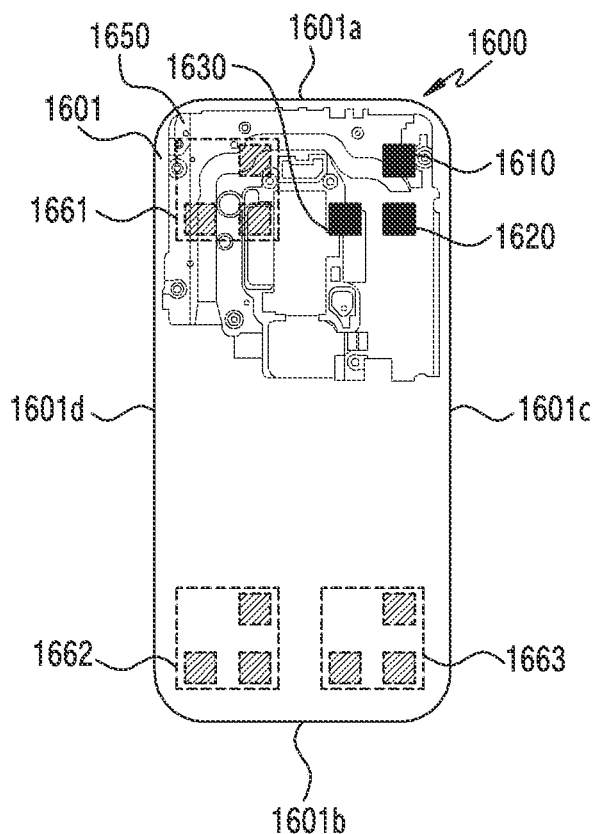
FIG. 16B is a diagram illustrating an electronic device including a plurality of antennas according to an embodiment of the disclosure.

FIG. 16B is a diagram illustrating an electronic device including a plurality of antennas according to an embodiment of the disclosure.

The description of FIG. 16A may be applied to FIG. 16B except for the position where the third antenna 1630 is disposed.

Referring to FIG. 16B, in an embodiment different from FIG. 16A, the second antenna 1620 and the third antenna 1630 may be spaced apart from the first edge 1601a by a designated distance. The second antenna 1620 and the third antenna 1630 may be spaced apart from each other by a designated distance from the second edge 1601b. The second antenna 1620 and the third antenna 1630 may be disposed closer to the first edge 1601a than to the second edge 1601b. A distance between the second antenna 1620 and the third edge 1601c may be different from a distance between the third antenna 1630 and the third edge 1601c. A straight line passing through the second antenna 1620 and the third antenna 1630 may be substantially parallel to the first edge 1601a. A straight line passing through the second antenna 1620 and the third antenna 1630 may be a line segment passing through the center of the feeding portion or the center of the radiating portion of the second antenna 1620 and the third antenna 1630.

In an embodiment different from FIG. 16A, according to various embodiments, the first antenna 1610 and the third antenna 1630 may be spaced apart from each other by different distances from the third edge 1601c. A straight line passing through the first antenna 1610 and the third antenna 1630 may pass through the first edge 1601a and the third edge 1601c. A straight line passing through the second antenna 1620 and the third antenna 1630 may be a straight line passing through the center of the feeding portion or the center of the radiating portion of the second antenna 1620 and the third antenna 1630.

Figure 16C:
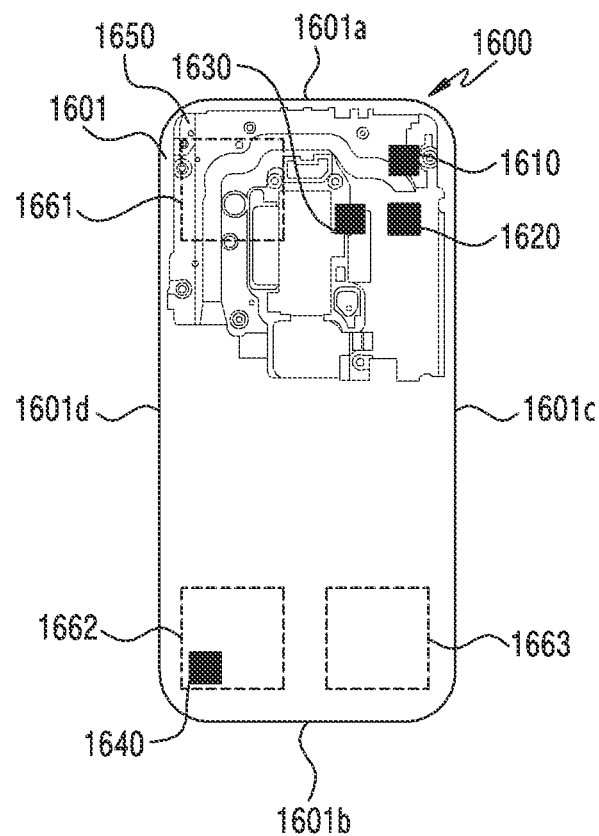
FIG. 16C is a diagram illustrating an electronic device including a plurality of antennas according to an embodiment of the disclosure.

FIG. 16C is a diagram illustrating an electronic device including a plurality of antennas according to an embodiment of the disclosure.

The description of FIGS. 16A and 16B may be applied to FIG. 16C except that a fourth antenna 1640 is further included.

The electronic device 1600 according to various embodiments may further include the fourth antenna 1640. The fourth antenna 1640 may be disposed at a corner opposite one corner of the housing 1601 adjacent to the first antenna 1610, the second antenna 1620, and the third antenna 1630. A first corner may be defined by the first edge 1601a and the third edge 1601c, a second corner may be defined by the first edge 1601a and the fourth edge 1601d, a third corner may be defined by the second edge 1601b and the fourth edge 1601d, and a fourth corner may be defined by the second edge 1601b and the third edge 1601c.

Referring to FIG. 16C, the fourth antenna 1640 may be disposed in a second area 1662 adjacent to the third corner when, for example, the first antenna 1610, the second antenna 1620, and the third antenna 1630 are disposed in an area adjacent to the first corner. As another example, when the first antenna 1610, the second antenna 1620, and the third antenna 1630 are disposed in a first area 1661 adjacent to the first corner, the fourth antenna 1640 may be disposed in a third area 1663 adjacent to the fourth corner. As another example, when the first antenna 1610, the second antenna 1620, and the third antenna 1630 are disposed in the second area 1662 adjacent to the third corner, the fourth antenna 1640 may be disposed in an area adjacent to the first corner.

According to various embodiments, the fourth antenna 1640 may be an antenna that assists at least one of the first antenna 1610, the second antenna 1620, and/or the third antenna 1630. For example, when the performance of at least one of the first antenna 1610, the second antenna 1620, and/or the third antenna 1630 is deteriorated, it is possible to prevent the wireless communication performance of the electronic device 1600 from being deteriorated by activating the fourth antenna 1640.

Figure 17:
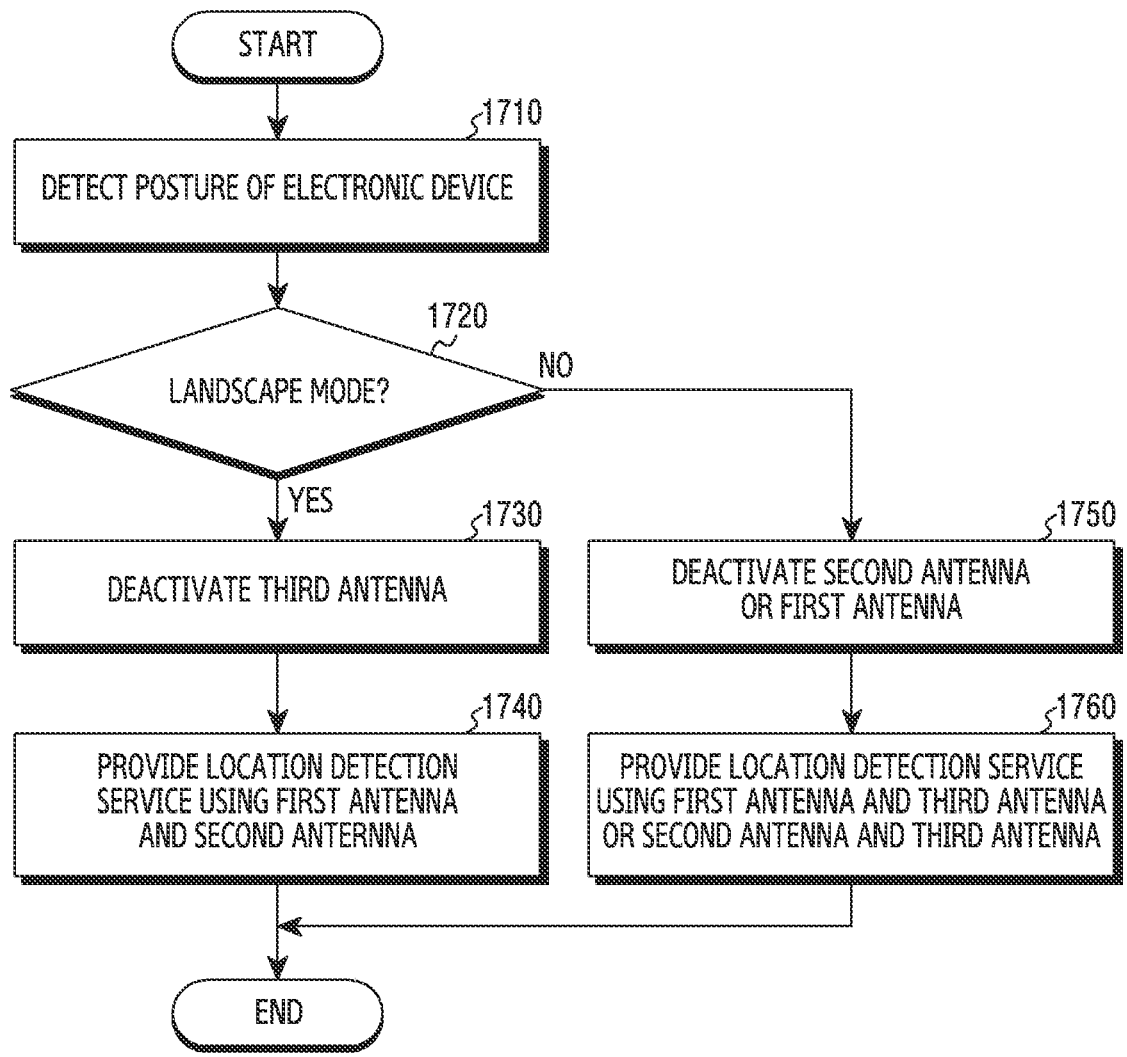
FIG. 17 is a flowchart illustrating a method of providing a location-based service through an electronic device including a plurality of antennas according to an embodiment of the disclosure.

FIG. 17 is a flowchart illustrating a method of providing a location-based service through an electronic device including a plurality of antennas according to an embodiment of the disclosure. This method may be executed by the electronic device 1600 of FIGS. 16A, 16B, and 16C or the processor 120 (e.g., the processor 120 of FIG. 2A) of the electronic device 1600.

In operation 1710, the processor 120 may detect the posture of the electronic device 1600 using the sensor module 176 (e.g., the sensor module 176 of FIG. 2A).

Referring to FIG. 17, operation 1710 may correspond to operation 610 illustrated in FIG. 6.

In operation 1720, the processor 120 may identify whether the electronic device 1600 is in the landscape mode based on the posture of the electronic device 1600 detected in operation 1710. The operation of identifying whether the electronic device 1600 is in the landscape mode in operation 1710 may correspond to operation 620 illustrated in FIG. 6. When it is identified that the electronic device 1600 is in the landscape mode, the processor 120 may perform operation 1730, otherwise, the processor 120 may perform operation 1750.

In operation 1730, the processor 120 may deactivate the third antenna 1630 based on identifying that the electronic device 1600 is in the landscape mode.

In operation 1740, the processor 120 may provide a location-based service using the first antenna 1610 and the second antenna 1620 being in an active state. Operation 1740 illustrated in FIG. 17 may correspond to operation 630 illustrated in FIG. 6.

In operation 1750, the processor 120 may deactivate the second antenna 1620 or the first antenna 1610 based on identifying that the electronic device 1600 is not in the landscape mode. For example, the processor 120 may deactivate the second antenna 1620 when the third antenna 1630 is disposed as shown in FIG. 16A, and may deactivate the first antenna 1610 when the third antenna 1630 is disposed as shown in FIGS. 16B and 16C.

In operation 1760, the processor 120 may provide the location-based service by using the first antenna 1610 and the third antenna 1630 in the active state or the second antenna 1620 and the third antenna 1630 in the active state. For example, the processor 120 may provide the location-based service using the first antenna 1610 and the third antenna 1630 when the third antenna 1630 is disposed as shown in FIG. 16A, and may provide the location-based service using the second antenna 1620 and the third antenna 1630 when the third antenna 1630 is disposed as shown in FIGS. 16B and 16C. Operation 1760 illustrated in FIG. 17 may correspond to operation 630 illustrated in FIG. 6.

Figure 18:
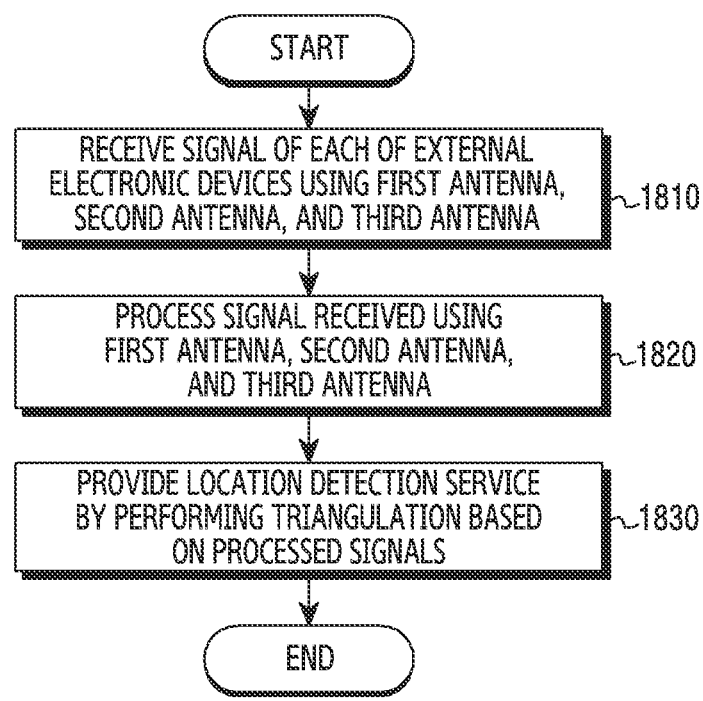
FIG. 18 is a flowchart illustrating a method of providing a location-based service through an electronic device including a plurality of antennas according to an embodiment of the disclosure.

FIG. 18 is a flowchart illustrating a method of providing a location-based service through an electronic device including a plurality of antennas according to an embodiment of the disclosure. This method may be executed by the electronic device 1600 of FIGS. 16A, 16B, and 16C or the processor 120 of the electronic device 1600.

Referring to FIG. 18, in operation 1810, the processor 120 may receive signals of respective external electronic devices using the first antenna 1610, the second antenna 1620, and the third antenna 1630.

In operation 1820, the processor 120 may process the signals received using the first antenna 1610, the second antenna 1620, and the third antenna 1630. For example, the processor 120 may acquire or generate data on the phase, angle, and distance of each of the received signals using the RF circuit 192 (e.g., the RF circuit 192 of FIG. 2A).

In operation 1830, the processor 120 may perform triangulation through the first antenna 1610, the second antenna 1620, and the third antenna 1630 based on the acquired or generated data, thereby calculating the location of each of the plurality of the external electronic devices. The processor 120 may provide the location-based service to the user of the electronic device 1600 based on the calculated location of each of the plurality of external electronic devices.

Figure 19:
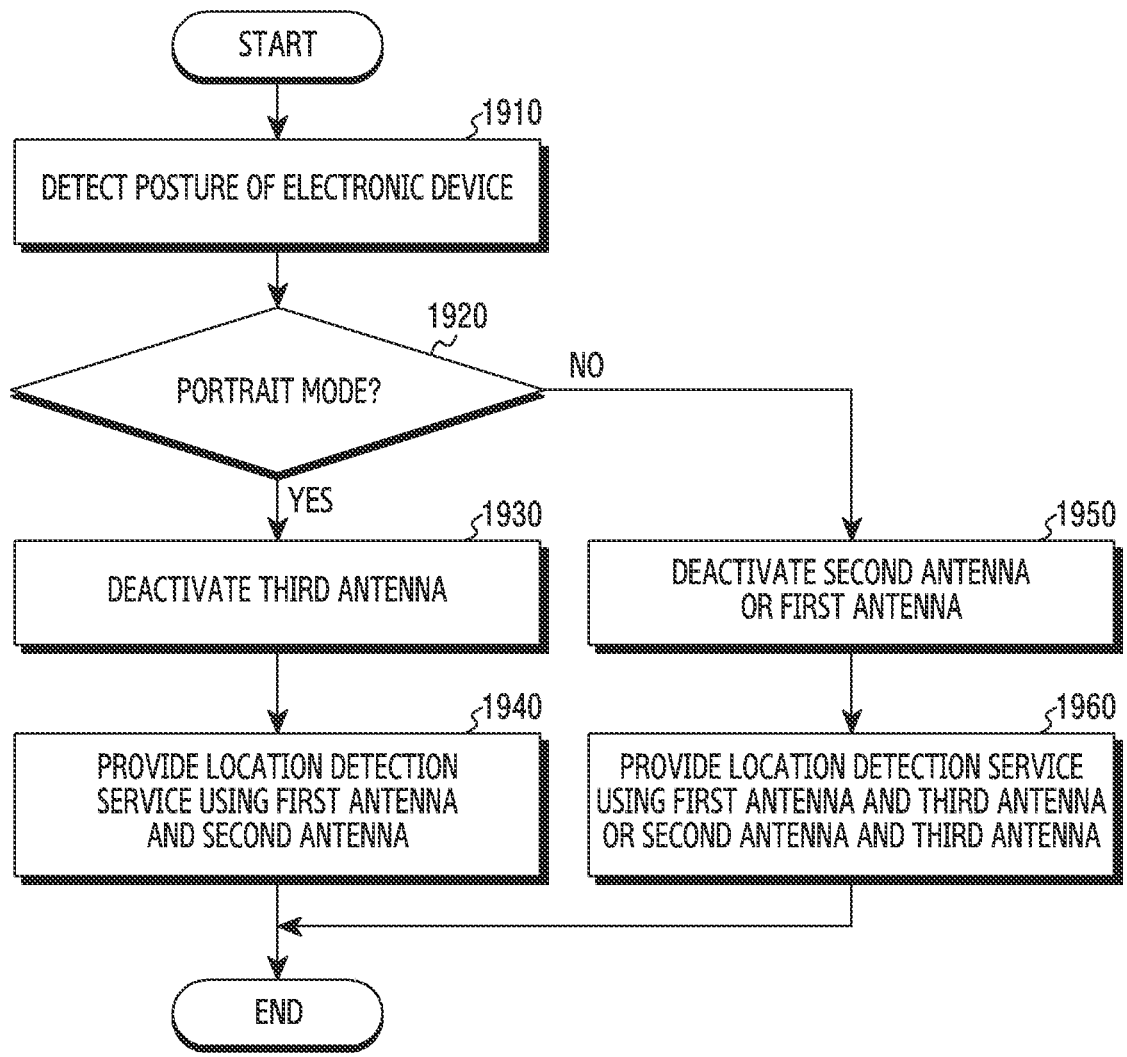
FIG. 19 is a flowchart illustrating a method of providing a location-based service through an electronic device including a plurality of antennas according to an embodiment of the disclosure.

FIG. 19 is a flowchart illustrating a method of providing a location-based service through an electronic device including a plurality of antennas according to an embodiment of the disclosure. This method may be executed by the electronic device 1600 of FIGS. 16A, 16B, and 16C or the processor 120 (e.g., the processor 120 of FIG. 2A) of the electronic device 1600.

In operation 1910, the processor 120 may detect the posture of the electronic device 1600 using the sensor module 176 (e.g., the sensor module 176 of FIG. 2A). Operation 1910 illustrated in FIG. 19 may correspond to operation 610 illustrated in FIG. 6.

In operation 1920, the processor 120 may identify whether the electronic device 1600 is in the portrait mode based on the posture of the electronic device 1600 detected in operation 1910. When it is identified that the electronic device 1600 is in the portrait mode, the processor 120 may perform operation 1930 and otherwise, perform operation 1950.

In operation 1930, the processor 120 may deactivate the third antenna 1630 based on identifying that the electronic device 1600 is in the portrait mode.

In operation 1940, the processor 120 may provide a location-based service using the first antenna 1610 and the second antenna 1620 being in an active state. Operation 1940 illustrated in FIG. 19 may correspond to operation 640 illustrated in FIG. 6.

In operation 1950, the processor 120 may deactivate the second antenna 1620 or the first antenna 1610 based on identifying that the electronic device 1600 is not in the portrait mode (e.g., a landscape mode). For example, the processor 120 may deactivate the second antenna 1620 when the third antenna 1630 is disposed as shown in FIG. 16A, and may deactivate the first antenna 1610 when the third antenna 1630 is disposed as shown in FIGS. 16B and 16C.

In operation 1960, the processor 120 may use the first antenna 1610 and the third antenna 1630 in the active state or the second antenna 1620 and the third antenna 1630 in the active state to provide the location-based service. For example, when the third antenna 1630 is disposed as shown in FIG. 16A, the processor 120 may provide the location-based service using the first antenna 1610 and the third antenna 1630, and may provide the location-based service using the second antenna 1620 and the third antenna 1630 when the third antenna is disposed as shown in FIGS. 16B and 16C. Operation 1960 illustrated in FIG. 19 may correspond to operation 640 illustrated in FIG. 6.

In an embodiment, a plurality of external electronic devices may be located within the coverage (e.g., the coverage of the second mode of FIG. 8) of the electronic device 1600 while the electronic device 1600 provides the location-based service in operations 1940 and 1960. The processor 120 may identify the location of each of the plurality of external electronic devices based on distance data between the electronic device 1600 and each of the plurality of external electronic devices using a plurality of activated antennas. For example, the processor 120 may identify the locations of the plurality of external electronic devices using the first antenna 1610 and the second antenna 1620 in operation 1940. For example, in operation 1960, the processor 120 may identify the locations of the plurality of external electronic devices using the first antenna 1610 and the third antenna 1630, or may identify the locations of the plurality of external electronic devices using the second antenna 1620 and the third antenna 1630.

In another embodiment, when the plurality of external electronic devices is located within the coverage area of the electronic device 1600, the processor 120 may activate the deactivated antenna to identify the location of each of the plurality of external electronic devices.

For example, the processor 1200 may change the third antenna 1630 being in an inactive state into an active state in operation 1940. The processor 120 may identify the locations of the plurality of external electronic devices by using the first antenna 1610 and the third antenna 1630 which area in the active state. The operation in which the processor 120 identifies the locations of the plurality of external electronic devices using the first antenna 1610 and the third antenna 1630 in operation 1940 may correspond to operation 630 of FIG. 6.

As another example, the processor 1200 may change the second antenna 1620 (in the case of FIG. 16A) or the first antenna 1610 (in the case of FIGS. 16B and 16C) which is in the inactive state into the active state in operation 1960. The processor 120 may identify the locations of the plurality of external electronic devices by using the first antenna 1610 and the second antenna 1620 in the active state. The operation in which the processor 120 identifies the locations of external electronic devices using the first antenna 1610 and the second antenna 1620 in operation 1960 may correspond to operation 630 of FIG. 6.

In an embodiment, the operation of activating the deactivated antenna to identify the locations of the plurality of external electronic devices located within the coverage of the electronic device 1600 in operations 1940 and 1960 may be performed before performing operations 1940 and 1960. In another embodiment, in operations 1940 and 1960, the operation of activating the deactivated antenna to identify the locations of the plurality of external electronic devices located within the coverage of the electronic device 1600 may be performed according to a designated time interval and/or a designated number of times while performing operations 1940 and 1960.

In an embodiment, when the plurality of external electronic devices are located within the coverage, an operation of selecting one electronic device from among the plurality of external electronic devices may be performed based on a user interface indicating a list of the electronic devices in addition to the operations illustrated in FIGS. 13A, 13B, 13C, 13D, and 13E. For example, even when the user selects the external electronic device 1301 through the gesture 1331 of FIG. 13B, another external electronic device (not shown) may be located within the coverage of the electronic device. The processor 120 may perform the operation of identifying the locations of the plurality of external electronic devices in operation 1940 or operation 1960 described above. The processor 120 may display the user interface including the list of the plurality of external electronic devices based on information on the ID of each of the plurality of external electronic devices. The user may select one of the plurality of external electronic devices through the user interface.

An electronic device (e.g., the electronic device 400 of FIG. 4) according to an embodiment may include a housing (e.g., the housing 401 of FIG. 4) configured to include a first edge (e.g., the first edge 401*a* of FIG. 4), a second edge (e.g., the second edge 401*b* of FIG. 4) substantially parallel to the first edge, a third edge (e.g., the third edge 401*c* of FIG. 4) extending from one end of the first edge to one end of the second edge and longer than the first edge, and a fourth edge (e.g., the fourth edge 401*d* of FIG. 4) extending from the other end of the first edge to the other end of the second edge and longer than the first edge, a first antenna (e.g., the first antenna 410 of FIG. 4) and a second antenna (e.g., the second antenna 420 of FIG. 4) configured to be disposed in the housing to be spaced apart by a first distance to the third edge, the first antenna and the second antenna being located at different distances from the first edge, a communication circuit (e.g., the RF circuit 192 of FIG. 2A) configured to be operatively connected to the first antenna and the second antenna, at least one sensor (e.g., the sensor module 176 of FIG. 2A) configured to be disposed in the housing, a processor (e.g., the processor 120 of FIG. 2A) configured to be operatively connected to the first antenna, the second antenna, the communication circuit, and the at least one sensor, and a memory (e.g., the memory 130 of FIG. 2A) configured to be operatively connected to the processor, wherein the memory may store instructions which, when executed, enable the processor to identify the posture of the electronic device using the at least one sensor, determine, when the identified posture of the electronic device is in a landscape state, the location of at least one external electronic device based on at least one signals received from the at least one external electronic device, and determine, when the identified posture of the electronic device is in a portrait state, the location of the external electronic device based on a signal received from the external electronic device located in a direction determined based on the arrangement of the first antenna and the second antenna among the at least one external electronic device.

In an embodiment, the instructions may enable the processor to receive the at least one signal from the at least one external electronic device by using the communication circuit when the electronic device is in the landscape state, identify a round trip time (RTT) and an arrival of angle (AOA) of the at least one signal based on the received at least one signal, determine the location of the at least one external electronic device based on the identified RTT and the identified AOA, receive the at least one signal from the at least one external electronic device by using the communication circuit when the electronic device is in the portrait state, identify the AOA of the at least one signal based on the received at least one signal, identify the external electronic device located in the direction determined based on the arrangement of the first antenna and the second antenna among the at least one external electronic device based on the identified AOA, and determine the location of the external electronic device by using the identified RTT and the identified AOA based on the signal received from the external electronic device.

In an embodiment, when the number of the at least one external electronic device is plural and the electronic device is in the portrait state, the instructions may enable the processor to delay or ignore processing of signals received from the remaining external electronic devices except for the identified external electronic device among the external electronic devices, based on the identification of the external electronic device.

In an embodiment, a first coverage for location measurement using the first antenna and the second antenna may have a first range while the electronic device is in the landscape state, and a second coverage for location measurement using the first antenna and the second antenna may have a second range that is narrower than the first range while the electronic device is in the portrait state.

In an embodiment, while the electronic device is in the portrait state, the remaining external electronic devices except for the identified external electronic device among the plurality of external electronic devices may be located in areas other than the second coverage.

In an embodiment, the at least one external electronic device may be located in front of the third edge.

In an embodiment, the direction determined based on the arrangement of the first antenna and the second antenna may correspond to a direction of a straight line passing through the first antenna and the second antenna.

In an embodiment, the first antenna and the second antenna may be closer to the third edge than to the fourth edge, and may be closer to the first edge than to the second edge.

The electronic device according to an embodiment may further include a display (e.g., the display 160 of FIG. 2A), wherein at least one signal received from the at least one external electronic device may include information on an identifier (ID) of the at least one external electronic device, and the instructions may enable the processor to indicate the at least one external electronic device based on the determined location and the information on the ID and display at least one visual object (e.g., the objects 901*b*, 902*b*, 903*b*, and 904*b* of FIG. 9B) indicating the locations of the at least one external electronic device on the display.

The electronic device according to an embodiment may further include another communication circuit configured to be distinct from the communication circuit, wherein the instructions may enable the processor to receive an external input (e.g., the user input 932 of FIG. 9B) for selecting one visual object among the displayed at least one visual object while the electronic device is in the landscape state, and establish a wireless connection with the external electronic device (e.g., the external electronic device 903*a* of FIG. 9B) indicated by the visual object among the at least one external electronic device by using the another communication circuit.

The electronic device according to an embodiment may further include another communication circuit configured to be distinct from the communication circuit, wherein the instructions may enable the processor to receive a designated input (e.g., the gestures 1331, 1332, 1334, and 1334 of FIG. 13B) while the electronic device is in the portrait state, and establish a wireless connection with the external electronic device (e.g., the external electronic device 1301 of FIG. 13B) by using the another communication circuit, in response to the reception of the designated input.

In an embodiment, the designated input may include any one of facing, by a designated portion of the housing of the electronic device, the external electronic device for a designated time, identifying that the external electronic device is located in the direction determined based on the arrangement of the first antenna and the second antenna for a designated time, using the communication circuit, or identifying, using the at least one sensor, that the posture of the electronic device is changed while identifying that the external electronic device is located in the direction determined based on the arrangement of the first antenna and the second antenna by using the communication circuit.

The electronic device according to an embodiment may further include a display (e.g., the display 160 of FIG. 2A), wherein the designated input may include receiving a user input to a visual object displayed using the display, in a state in which the external electronic device is located in the direction determined based on the arrangement of the first antenna and the second antenna.

The electronic device according to an embodiment may further include a camera module (e.g., the camera module 180 of FIG. 1), and another communication circuit that is distinct from the communication circuit, wherein the instructions may enable the processor to identify the external electronic device located within a field of view (FOV) of the camera module among the at least one external electronic device based on the determined location of the at least one external electronic device while the electronic device is in the landscape state, and transmit image data acquired using the camera module to the identified external electronic device through the another communication circuit.

The electronic device according to an embodiment may further include a display (e.g., the display 160 of FIG. 2A), and a camera (e.g., the camera module 180 of FIG. 1), wherein the instructions may enable the processor to display a preview image based on at least some of images acquired using the camera on the display, identify that an auto-focused subject (e.g., the subject 1102 of FIG. 11B) holding one external electronic device (e.g., the external electronic device 1101 of FIG. 11B) among the at least one external electronic device deviates out of the FOV of the camera using the camera, and maintain tracking of the auto-focused subject by tracking the location of the held external electronic device using the communication circuit.

In an embodiment, the instructions may enable the processor to display a visual object (e.g., the visual object 1103 of FIG. 11B) indicating a direction in which the subject deviates out of the FOV of the camera in superimposition on the preview image based on tracking the location of the held external electronic device.

The electronic device according to an embodiment may further include a display (e.g., the display 160 of FIG. 2A), and a camera (e.g., the camera module 180 of FIG. 1), wherein the instructions may enable the processor to display a preview image based on at least some of images acquired using the camera while the electronic device is in the landscape state, identify an augmented reality (AR) image (e.g., the AR image 1202 of FIG. 12B) corresponding to the at least one external electronic device among a plurality of AR images, based on information on the ID of the least one external electronic device included in the at least one signal while the preview image is displayed, and display the identified AR image in superimposition on the preview image based on the location of the at least one external electronic device.

In an embodiment, the preview image may include at least one object corresponding to each of the at least one external electronic device, and the instructions may enable the processor to display the identified image to be at least partially superimposed with the at least one object, based on the location of the at least one external electronic device.

The electronic device according to an embodiment may further include a time of flight (TOF) camera, wherein the instructions may enable the processor to determine a location where the AR image is to be displayed in superimposition on the preview image, based on information on a distance between the at least one object acquired using the TOF camera and the electronic device and information on the location of the at least one external electronic device identified using the communication circuit.

An electronic device according to an embodiment may include a housing (e.g., the housing 401 of FIG. 4) configured to include a first edge (e.g., the first edge 401a of FIG. 4), a second edge (e.g., the second edge 401b of FIG. 4) substantially parallel to the first edge, a third edge (e.g., the third edge 401c of FIG. 4) extending from one end of the first edge to one end of the second edge and longer than the first edge, and a fourth edge (e.g., the fourth edge 401d of FIG. 4) extending from the other end of the first edge to the other end of the second edge, a first antenna (e.g., the first antenna 410 of FIG. 4) and a second antenna (e.g., the second antenna 420 of FIG. 4) in the housing, wherein the first antenna and the second antenna being spaced apart from the third edge by a first distance and being located at different distances from the first edge, a communication circuit (e.g., the RF circuit 192 of FIG. 2A) configured to be operatively connected to the first antenna and the second antenna, at least one sensor (e.g., the sensor module 176 of FIG. 2A) configured to acquire information on the posture of the electronic device and to be disposed in the housing, and a processor (e.g., the processor 120 of FIG. 2A) configured to be operatively connected to the first antenna, the second antenna, the communication circuit, and the at least one sensor, wherein the processor may operate in a first mode of determining the location of each of a plurality of external electronic devices based on a plurality of signals received from the plurality of external electronic devices located around the electronic device while the electronic device is in a landscape mode using the sensor, and may operate in a second mode of determining the location of the external electronic device among the plurality of external electronic devices, based on a signal received from the external electronic device located in a direction determined based on the arrangement of the first antenna and the second antenna among the plurality of external electronic devices while the electronic device is in a portrait mode using the sensor.

In the specific embodiments of the disclosure described above, components included in the disclosure are expressed in the singular or plural according to the presented specific embodiments. However, the singular or plural expression is appropriately selected for the context presented for convenience of description, and the disclosure is not limited to the singular or plural element, and even if the element is expressed in plural, it is composed of the singular or singular. Furthermore, an expressed component may be composed of a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first edge, a second edge substantially parallel to the first edge, a third edge extending from one end of the first edge to one end of the second edge and longer than the first edge, and a fourth edge extending from the other end of the first edge to the other end of the second edge and longer than the first edge;

a first antenna and a second antenna disposed in the housing to be spaced apart by a first distance to the third edge, the first antenna and the second antenna being located at different distances from the first edge;

a communication circuit configured to be electrically connected to the first antenna and the second antenna;

at least one sensor disposed in the housing;

a processor configured to be electrically connected to the first antenna, the second antenna, the communication circuit, and the at least one sensor; and a memory configured to be electrically connected to the processor, wherein the memory stores instructions which, when executed, enable the processor to:

identify a posture of the electronic device using the at least one sensor, determine, when the identified posture of the electronic device is in a landscape state, a location of at least one external electronic device based on at least one signal received from the at least one external electronic device, and determine, when the identified posture of the electronic device is in a portrait state, a location of the external electronic device among the at least one external electronic device based on a signal received from the external electronic device located in a direction determined based on an arrangement of the first antenna and the second antenna.

2. The electronic device of claim 1, wherein the instructions further enable the processor to:

when the electronic device is in the landscape state:

receive the at least one signal from the at least one external electronic device using the communication circuit, identify a first round trip time (RTT) and a first arrival of angle (AOA) of the at least one signal based on the received at least one signal, and determine the location of the at least one external electronic device based on the identified first RTT and the identified first AOA, and when the electronic device is in the portrait state:

receive the signal from the external electronic device using the communication circuit, identify a second RTT and a second AOA of the signal based on the received signal, identify the external electronic device located in the direction determined based on the arrangement of the first antenna and the second antenna based on the identified second AOA, and determine the location of the external electronic device using the identified second RTT and the identified second AOA based on the signal received from the external electronic device.

3. The electronic device of claim 2, wherein, when a number of the at least one external electronic device is plural and the electronic device is in the portrait state, and wherein the instructions further enable the processor to delay or ignore processing of signals received from remaining external electronic devices except for the identified external electronic device among external electronic devices, based on identification of the external electronic device.

4. The electronic device of claim 1, wherein the direction determined based on the arrangement of the first antenna and the second antenna corresponds to a direction of a straight line passing through the first antenna and the second antenna.

5. The electronic device of claim 1, further comprising:

a display, wherein at least one signal received from the at least one external electronic device includes information on an identifier (ID) of the at least one external electronic device, and wherein the instructions further enable the processor to:

indicate the at least one external electronic device based on the determined location and the information on the ID and display at least one visual object indicating the location of the at least one external electronic device on the display.

6. The electronic device of claim 5, further comprising:

another communication circuit configured to be distinct from the communication circuit, wherein the instructions further enable the processor to:

receive an external input for selecting one visual object among the displayed at least one visual object while the electronic device is in the landscape state, and establish a wireless connection with the external electronic device indicated by the visual object among the at least one external electronic device by using another communication circuit.

7. The electronic device of claim 1, further comprising:

another communication circuit configured to be distinct from the communication circuit, wherein the instructions further enable the processor to:

receive a designated input while the electronic device is in the portrait state, and establish a wireless connection with the external electronic device by using another communication circuit, in response to receiving the designated input.

8. The electronic device of claim 7, wherein the designated input includes any one of:

facing, by a designated portion of the housing of the electronic device, the external electronic device for a designated time;

identifying that the external electronic device is located in the direction determined based on the arrangement of the first antenna and the second antenna for a designated time, using the communication circuit; or identifying, using the at least one sensor, that the posture of the electronic device is changed while identifying that the external electronic device is located in the direction determined based on the arrangement of the first antenna and the second antenna by using the communication circuit.

9. The electronic device of claim 1, further comprising:

a camera; and another communication circuit that is distinct from the communication circuit, wherein the instructions further enable the processor to:

identify the external electronic device located within a field of view (FOV) of the camera among the at least one external electronic device based on the determined location of the at least one external electronic device while the electronic device is in the landscape state, and transmit image data acquired using the camera to the identified external electronic device through another communication circuit.

10. The electronic device of claim 1, further comprising:

a display; and a camera,
wherein the instructions further enable the processor to:
- display a preview image based on at least some of images acquired using the camera on the display,
- identify that an auto-focused subject holding one external electronic device among the at least one external electronic device deviates out of a field of view (FOV) of the camera using the camera, and
- maintain tracking of the auto-focused subject by tracking a location of the held external electronic device using the communication circuit.

* * * * *